April 2, 1968  R. E. MORGAN ET AL  3,376,492
SOLID STATE POWER CIRCUITS EMPLOYING NEW
AUTOIMPULSE COMMUTATION
Filed March 26, 1964  15 Sheets-Sheet 1
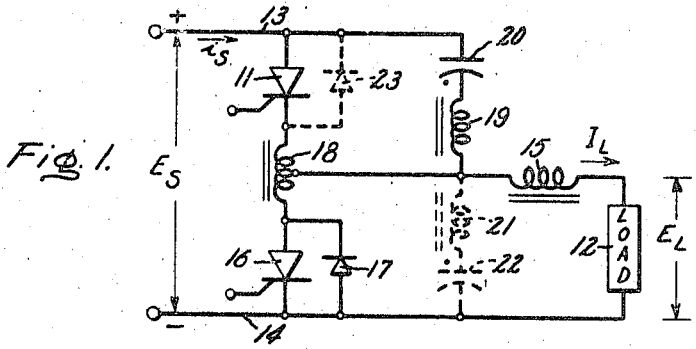
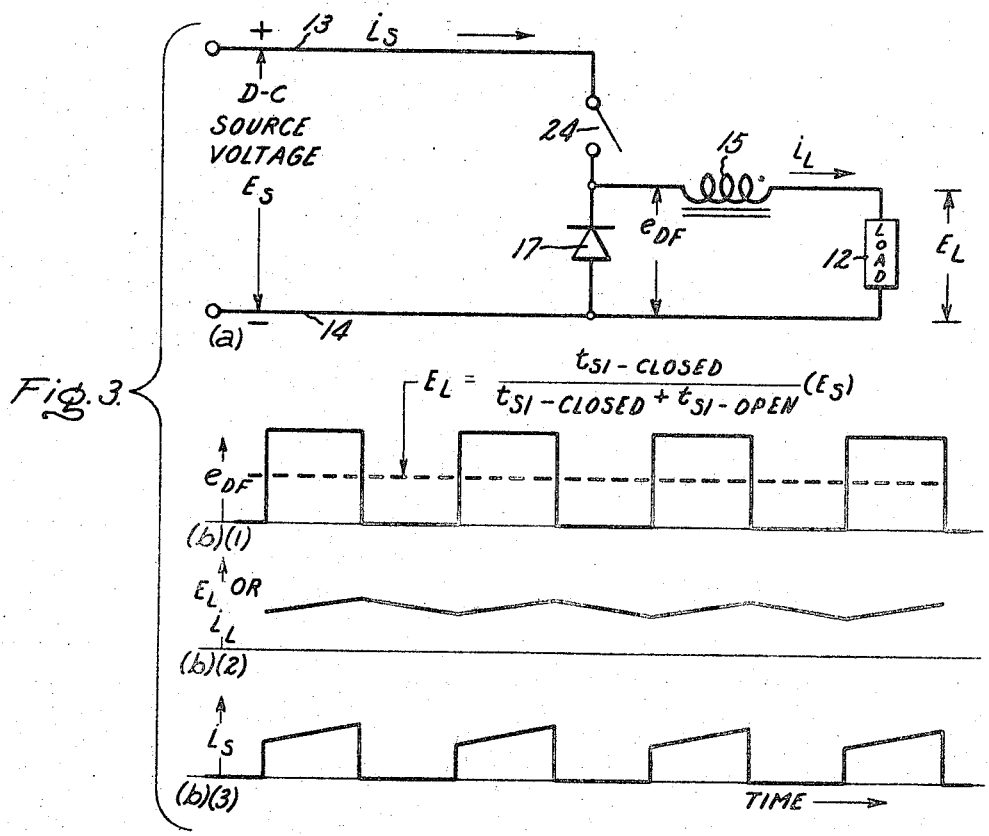
Inventors:
Raymond E. Morgan,
Burnice D. Bedford,
by Paul A. Frank
Their Attorney.

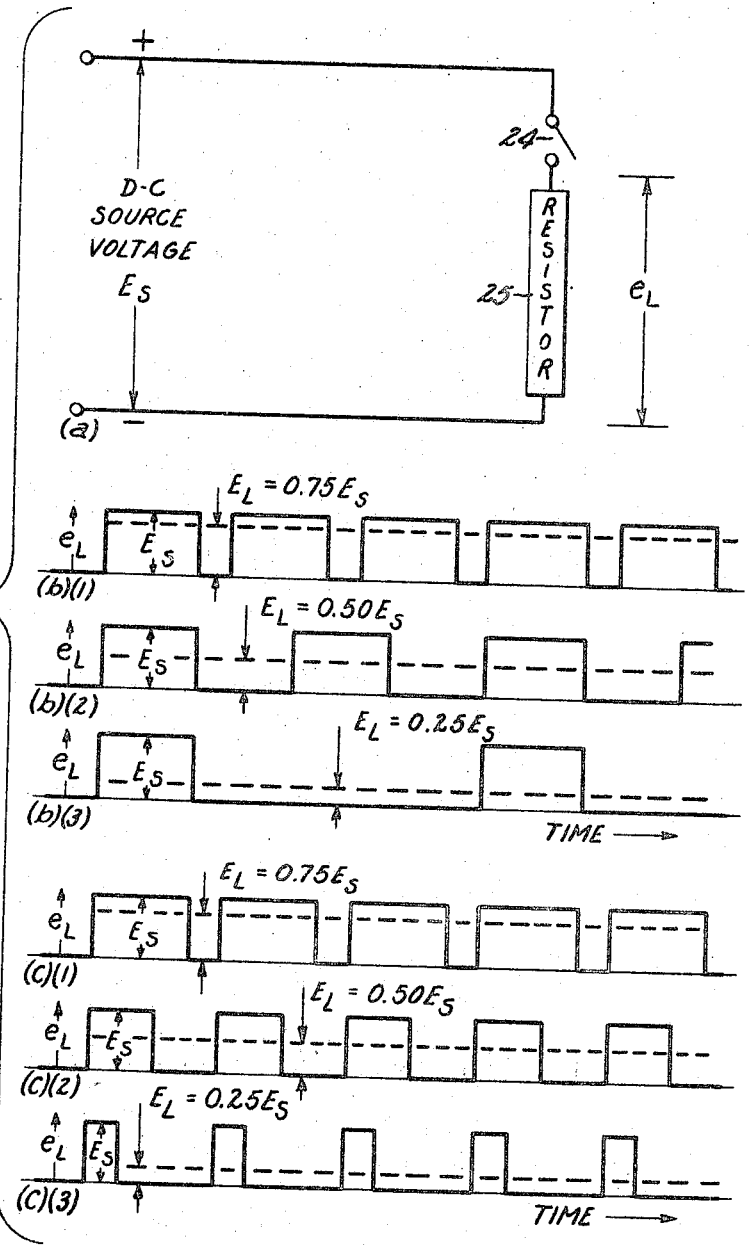

Inventors:
Raymond E. Morgan,
Burnice D. Bedford,
by Paul A. Frank
Their Attorney.

Inventors:
Raymond E. Morgan,
Burnice D. Bedford,
by Paul A. Frank
Their Attorney.

*Inventors:*
Raymond E. Morgan,
Burnice D. Bedford,
by Paul A. Frank
Their Attorney.

April 2, 1968  R. E. MORGAN ET AL  3,376,492
SOLID STATE POWER CIRCUITS EMPLOYING NEW
AUTOIMPULSE COMMUTATION
Filed March 26, 1964  15 Sheets-Sheet 6

Inventors:
Raymond E. Morgan,
Burnice D. Bedford,
by Paul A. Frank
Their Attorney.

Inventors:
Raymond E. Morgan,
Burnice D. Bedford,
by Paul A. Frank
Their Attorney.

Inventors:
Raymond E. Morgan,
Burnice D. Bedford,
by Paul A. Frank
Their Attorney.

Inventors:
Raymond E. Morgan,
Burnice D. Bedford,
by Paul G. Frank
Their Attorney.

Inventors:
Raymond E. Morgan,
Burnice D. Bedford,
by Paul A. Frank
Their Attorney.

Inventors:
Raymond E. Morgan,
Burnice D. Bedford,
by Paul A. Frank
Their Attorney.

United States Patent Office 3,376,492
Patented Apr. 2, 1968

3,376,492
SOLID STATE POWER CIRCUITS EMPLOYING NEW AUTOIMPULSE COMMUTATION
Raymond E. Morgan, Schenectady, and Burnice D. Bedford, Scotia, N.Y., assignors to General Electric Company, a corporation of New York
Filed Mar. 26, 1964, Ser. No. 354,888
49 Claims. (Cl. 321—43)

ABSTRACT OF THE DISCLOSURE

This invention comprises a family of improved power circuits using a pair of turn-on, nongate turn-off controlled conducting devices interconnected in series circuit relationship with a tapped first linear inductor across a pair of power supply terminals that are adapted to be connected across a source of electric potential. A load circuit is separately connected in series circuit relationship with the first of said pair of devices with the load circuit being connected through a direct current path between the tap point on the first linear inductor and one of the power supply terminals. The circuits are further comprised by commutation circuit means formed by at least one commutating capacitance and series connected second linear inductor with the series circuit thus comprised being connected between the tap point on the first linear inductor and to the remaining terminal (not connected to the first inductor) of one of the conducting devices. The series circuit comprised by the commutating capacitor and second inductor is tuned to series resonance at a commutating frequency having a period which is substantially shorter than the load current conducting periods of the power circuit. With this arrangement, one of the pair of controlled conducting devices is adapted to be intermittently rendered conductive for discharging the commutating capacitance through a portion of the first inductor and thereby terminating the conduction of the other of the pair of conducting devices. In preferred embodiments bidirectional conducting devices are employed, and where such bidirectional devices are employed the circuits may also provide operation in two different modes to allow for power supply to the load and for pump back of power from the load to the power source, as well as inversion from direct current to alternating current. Bridge type power circuits comprising the same basic circuit configurations are also provided.

---

Our invention relates to a family of new and improved power circuits employing new controlled turn-on conducting devices and a new and improved turn-off or commutation means therefor.

More particularly, our invention relates to a family of power circuits employing turn-on, nongate turn-off solid state semiconductor controlled devices for power switching purposes and is especially useful in time-ratio control of direct current electric power or for inversion of direct current electric power to alternating current electric power. Time-ratio control of direct current electric power refers to the interruption or chopping-up of a direct current electric potential by controlling the "on" time of a turn-on, turn-off power switching device connected in circuit relationship with a load and the direct current electric potential. Inversion of direct current electric power to alternating current electric power refers to the switching of a load across alternate output terminals of a direct current electric supply by appropriately switching turn-on, turn-off power switching devices connecting the load in circuit relationship with the direct current electric supply.

In recent years, the turn-on, turn-off power switching devices employed in the above described types of power circuits for the most part have employed a solid state semiconductor device known as a silicon controlled rectifier (SCR). The SCR is a four-layer PNPN junction device having a gating electrode which is capable of turning on current flow through the device with only a relatively small gating signal. The conventional SCR, however, is a nongate turn-off device in that once conduction through the device is initiated, the gate thereafter loses control over conduction through the device until it has been switched off by suitable external means. Such external means are generally referred to as commutation circuits and usually effect commutation or turning off of the SCR by reversal of the potential across the SCR. In addition to the SCR, recent advances in the semiconductor art have made available to industry new solid state semiconductor devices which are controlled turn-on, nongate turn-off conducting devices, but which are bidirectional conducting devices. A bidirectional conducting device is a device capable of conducting electric current in either direction through the device. The first of these devices, referred to as a "triac," is a gate controlled turn-on NPNPN junction device which, similar to the SCR, is a nongate turn-off device that must be turned off by external commutation circuit means. While the preferred form of a triac is a five-layer gate controlled device, it should be noted that four-layer PNPN and NPNP junction gate controlled triac devices are practical, as well as other variations, but the triac characteristics mentioned above are common to all. The second newly available power device, referred to as a "power diac" is a two-terminal, five-layer NPNPN junction device which, like the triac, has bidirectional conducting characteristics. In contrast to the SCR and triac, however, the diac is not a gate turn-on device, but must be turned on by the application of a relatively steep voltage pulse (high $dv/dt$) applied across its terminals. It should be noted that the SCR and triac may also be fired by the same high $dv/dt$ technique. However, the diac is similar to the SCR and triac in that it too must be turned off by external circuit commutation means. Our invention provides new and improved power circuits employing solid state semiconductor devices of the above general type as well as a new and improved commutation scheme for use with such devices. It should be expressly noted in this regard that the term "nongate turn-off device" as employed hereinafter and in the claims, is intended to include not only the specific devices discussed above but also includes so called gate assisted turn-off devices (also referred to as a GTOSCR) which require external commutation circuit means to assure complete turn-off, although the device is capable of achieving some degree of turn-off by the application of a reverse polarity, turn-off signal to its control gate. Additionally, it should be noted that the generic term "bidirectional conducting device" as employed hereinafter and in the claims, is intended to cover not only the single "triac" and "diac" bidirectional conducting devices described briefly above, but also is intended to cover such known arrangements as reverse polarity, parallel connected SCR's as well as a single SCR and reverse polarity, parallel connected diode, etc. These devices are to be distinguished from "controlled conductivity bidirectional conducting devices" (such as triacs, diacs, reverse polarity, parallel connected SCR's) wherein conduction through the device in each direction is controlled. Power circuits employing "bidirectional conducting devices" have been disclosed in the published literature as well as hereinafter along with such circuits employing "conductivity controlled bidirectional conducting devices."

It is, therefore, a primary object of our invention to provide an entire family of new and improved power circuits employing controlled turn-on nongate turn-off conducting devices.

Another object of our invention is to provide a new and improved commutation scheme for power circuits employing controlled turn-on, nongate turn-off conducting devices which allows for a reduction in the size of components employed in the circuit for a given power rating and, hence, is economical to manufacture.

A further object of our invention is to provide a new and improved commutation scheme which is economical and efficient in operation and which provides reliable commutation that is independent of load from no load to full load operating conditions.

In practicing our invention, new and improved power circuits are provided using controlled turn-on, nongate turn-off solid state semiconductor devices. These new and improved power circuits include in combination a pair of interconnected turn-on, nongate turn-off controlled conducting devices in series circuit relationship across a pair of power supply terminals that, in turn, are adapted to be connected across a source of electric potential. The pair of controlled conducting devices are interconnected by means of a tapped first linear inductance. A first of the pair of controlled conducting devices is also connected in series circuit relationship with a load circuit including a filter inductance wherein the load circuit is connected between the tap point of the first linear inductance and one of the power supply terminals. Turn-on gating and firing circuit means are provided for controlling the turn-on of the controlled conducting devices, and commutation circuit means are provided for commutating off the devices at desired intervals. The commutation circuit means comprises the tapped first linear inductance and a pair of series connected second linear inductances and commutating capacitors wherein a first of the pair of series connected inductances and capacitors is connected between the tap point of the first inductance and a first of the power supply terminals and the second of the pair of series connected inductances and capacitors is connected between the same tap point and the second power supply terminal. Each of the pair of series connected second inductances and capacitors is tuned to series resonance at a substantially higher frequency than the power circuit operating frequency.

The features of our invention which we desire to protect herein are pointed out with particularity in the appended claims. The invention itself, however, both as to its organization and method of operation, together with further objects and advantages thereof, may thus be understood by reference to the following description taken in connection with the accompanying drawings wherein like parts in each of the drawings are identified by the same character reference and wherein:

FIGURE 1 is a detailed circuit diagram of a new and improved time-ratio control power circuit employing a new and improved commutation means in accordance with our invention;

FIGURE 2 is an equivalent circuit representation illustrating the time-ratio control principle together with a series of curves depicting the form of variable voltage direct current electric energy derived from time-ratio control power circuits;

FIGURE 3 is an equivalent circuit diagram of a time-ratio control circuit and associated characteristic curves illustrating the effect of a coasting rectifier and filter inductance added to the equivalent circuit of FIGURE 2;

Figure 4:
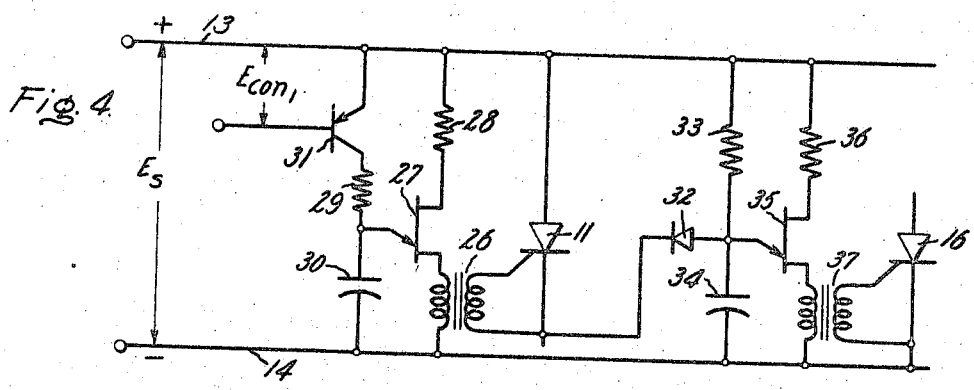
FIGURE 4 is a detailed circuit diagram of a suitable gating on circuit for use with the time-ratio control circuit shown in FIGURE 1.

A new and improved time-ration control power circuit illustrated in FIGURE 1 of the drawings is comprised by a first gate turn-on, nongate turn-off solid state silicon controlled rectifier device, SCR 11, and a load 12, effectively coupled in series circuit relationship across a pair of power supply terminals 13 and 14 which, in turn, are adapted to be connected across a source of electric potential. In the particular embodiments of the invention shown herein, the source of electrical potential $E_s$ is a direct current power supply having its positive potential applied to terminal 13 and its negative potential applied to terminal 14. It should be noted that while the time-ratio control circuits herein disclosed are drawn in connection with direct current power supplies, with very little modification these circuits could be used to remove or chop out any desired portion of a half-cycle of applied alternating current potential. A filter inductance 15 is connected in series circuit relationship intermediate SCR 11 and load 12 and a second gate turn-on, nongate turn-off solid state SCR device 16 and a coasting diode 17 are connected in parallel circuit relationship with the filter inductance 15 and load 12.

Commutation circuit means are provided for terminating the conduction (turning off) of SCR 11 and comprise tightly coupled tapped first linear inductance winding 18, which interconnects SCR 11 and SCR 16, and a pair of series connected second linear inductances and commutating capacitors. The first of the pair of series connected inductances and capacitors, comprising inductance 19 and capacitor 20, is connected between the tap point of inductance 18 and power supply terminal 13. The second of the pair of series connected inductances and capacitors, comprising inductance 21 and capacitor 22 (shown in dotted line form), is connected between the tap point and the negative power supply terminal 14. Each of the pair of series connected second inductances and capacitors is tuned to series resonance at a frequency which is substantially higher than the power circuit operating frequency. The series circuit comprising linear inductance 21 and commutating capacitor 22 is shown in dotted line form since such circuit would not be required in the event that the direct current power source supplies an infinite or stiff bus, that is, maintains a constant output voltage. In the more general case, such output voltage is slightly variable and in such case, inductance 21 and capacitor 22 would be connected as shown. Properly phased gating on signals are applied to the gating on electrodes of SCR's 11 and 16 from a suitable gating signal control circuit such as that shown in FIGURE 4 of the drawings for gating on the SCR's in properly timed sequence as explained hereinafter. A second unidirectional conducting device comprising feedback diode 23 may be directly connected across SCR 11 and is shown in dotted line form since this diode is used only when electric energy is being fed back to the power supply as also explained hereinafter.

In operation, if it is assumed that initially SCR 11, which for purposes of explanation will be defined as the load current carrying SCR, and SCR 16, which for this purpose will be described as the commutating SCR, are each in their nonconducting or blocking state but with coasting diode 11 conduction due to a preceding cycle of operation, then capacitor 20 is charged to the power supply voltage and the capacitor 22 has no charge thereon. The circuit remains in this condition until such time that a gating on signal is applied to the gating on electrode of SCR 11. Upon this occurrence, SCR 11 becomes conducting or turned on, current $i_s$ is supplied thereto from the power supply, and the full power supply voltage $E_s$ is essentially across inductance 18 with coasting diode 17 conducting (due to a preceding cycle of operation). It will be assumed, for purposes of explanation, that winding 18 is center-tapped, although in the most general case the tap point need not be at the center. It, therefore, follows that the center tap of inductance 18 is at one-half of the power supply voltage $E_s$. This immediate rise of voltage at the center tap from 0 to ½ of the supply voltage causes capacitor 22 to begin to charge and capacitor 20 to discharge. At steady state conditions, the load current $I_L$ flows in the series circuit comprising SCR 11, the upper half of winding 18, filter inductance 15, and load 12. At such steady state conditions, the center tap of inductance 18, the dot end of capacitor 20, and the dot end of capacitor 22 are at full line voltage. Load current carrying SCR 11 remains conducting for a time period dependent upon the amount of current to be supplied to load 12 and then is rendered nonconducting or commutated off in the manner of a time-ratio control power circuit.

The theory of operation of time-ratio power control is best illustrated in FIGURE 2 of the drawings wherein FIGURE 2(a) shows an on-off switch 24 connected in series circuit relationship with a load resistor 25 across a direct current power supply $E_s$. With the arrangement of FIGURE 2(a), there are two possible types of operation in order to supply variable amounts of power to the load resistor 25. In the first type of operation, switch 24 is left closed for fixed periods of time and the time that switch 24 is left open can be varied. This type of operation is illustrated in curves 2(b), wherein curve 2(b)(1) illustrates a condition where switch 24 is left open for only a short period of time compared to the time it is closed to provide an average voltage across load resistor 25 equal to about three-fourths of the supply voltage $E_s$ of the direct current power suply. In FIGURE 2(b)(2) the condition is shown where the switch 24 is left open for a period of time equal to that during which it is closed. Under this condition of operation, the voltage across the load will equal approximately 50 percent of the supply voltage $E_s$. FIGURE 2(b)(3) illustrates the condition where switch 24 is left open for a period of time equal to three times that for which the switch is closed so that the load voltage appearing across the load resistor 25 will be equal to about 25 percent of the supply voltage $E_s$. It can be appreciated that by varying the period of time during which switch 24 is left open, the amount of direct current potential applied across load 25 is varied proportionally.

In the second type of operation possible with time-ratio control circuits, switch 24 is closed at fixed times, and the time that the switch is left closed can be varied. This second type of operation of the circuit shown in FIGURE 2(a) is illustrated in FIGURE 2(c) of the drawings wherein the amount of time that switch 24 is left closed is varied. In FIGURE 2(c)(1), the condition where switch 24 is left closed for a much greater period of time than it is open, is illustrated to provide a load voltage $E_L$ of approximately $0.75E_s$. In FIGURE 2(c)(2), the time that switch 24 is left closed equals the time that it is open to produce a load voltage $E_L$ that is equal to $0.5E_s$. In FIGURE 2(c)(3), the condition is illustrated where switch 24 is left closed for a period of time equal to one-third of the time that switch 24 is left open to provide a load voltage equal to $0.25E_s$. It can be appreciated, therefore, that by varying the period of time that switch 24 is left closed, the amount of voltage supplied across load resistor 25 can be varied proportionally. In a similar fashion to that described with respect to switch 24, by varying the period of time that SCR 11 of the circuit shown in FIGURE 1 is either in a conducting or nonconducting condition, the power supplied to load 12 can be varied proportionally. It is a matter of adjustment of the phasing of the gating control signals supplied to the control gates of SCR 11 and SCR 16 which determines the amount of time that SCR 11 is either conducting or nonconducting. This of course, in turn, determines the power supplied to load 12 in the manner described with relation to FIGURE 2. Whether the amount of time that SCR 11 is in its blocking condition is varied, or whether the amount of time that SCR 11 is conducting is varied, to provide such proportionally controlled power to load 12 usually depends upon the load in question. Insofar as the principles of commutation to be described hereinafter are concerned, it does not matter which type of operation is employed.

FIGURE 3 of the drawings better depicts the nature of the output signal or voltage $E_L$ developed across load resistor 12 by the circuit shown in FIGURE 1. In FIGURE 3(a), SCR 11 is again depicted by the on-off switch 24, and the voltage or current versus time curves for the various elements of this circuit are illustrated in FIGURE 3(b). FIGURE 3(b)(1) illustrates the voltage versus time characteristics of the potential $e_{DF}$ appearing across the coasting diode 17. It is to be noted that the potential $e_{DF}$ is essentially a square wave potential whose period is determined by the timing of switch 24. For the period of time that switch 24 is left closed, a load current $i_L$ flows through filter inductance 15, load 12, and back into the power supply. Upon switch 24 being opened (which corresponds to SCR 11 being commutated off to its blocking or nonconducting condition) the energy trapped in the filter inductance 15 will try to produce a coasting current flow in a direction such that it will be positive at the dot end of the filter inductance. This energy, which is directly coupled across coasting diode 17, causes diode 17 to be rendered conductive and to circulate a coasting current substantially equal to load current $i_L$ through load 12 and coasting diode 17, thereby discharging filter inductance 15. Consequently, the load voltage $E_L$, and for that matter load current $i_L$, will appear substantially as shown in FIGURE 3(b)(2) of the drawings, as an essentially steady state value lower than the source voltage $E_s$ by a factor determined by the timing of on-off switch 24. This load voltage can be calculated from the expression shown in FIGURE 3. This expression states that the load voltage $E_L$ is equal to the time that switch 24 is left closed divided by the time that switch 24 is left closed plus the time switch 24 is left open, all multiplied by the power supply voltage $E_s$. The current $i_s$ supplied from the power supply to switch 24 is illustrated in FIGURE 3(b)(3) and is essentially of square wave form having the same period as the voltage $e_{DF}$. It should be noted that upon the next succeeding cycle of operation when switch 24 is closed, the filter inductance 15 will again be charged in a manner such that when it discharges upon switch 24 being opened, its potential is positive at the dot end so that the coasting rectifier 17 is again rendered conductive and discharges the filter inductance through load 12 to provide the essentially continuous steady state load voltage $E_L$ shown in FIGURE 3(b)(2).

Returning to FIGURE 1 of the drawings, it can be appreciated that the timing of SCR 11 being switched on and commutated off determines the load voltage $E_L$ supplied across load 12 in the manner discussed in connection with FIGURE 3 of the drawings. In order to commutate off the SCR 11, new and improved commutation circuit means comprised by elements 16–22 has been provided. The new and improved commutation circuit operates in the following manner: Assuming that SCR 11 is initially in its steady state "on" or conducting condition, the tap point and respective ends of inductance 18 as well as the dot ends of capacitors 20 and 22 are each at substantially full supply voltage. The circuit remains in this condition for the period of time that SCR 11 is allowed to conduct as determined by the time-ratio control principles described in connection with FIGURES 2 and 3. Thereafter, some precalculated number of microseconds prior to the time that it is desired to commutate off the load current carrying SCR 11, commutating SCR 16 is turned on by the application of a suitable gating signal to its gate such that SCR 16 conducts in a direction from the SCR end of winding 18 to power supply terminal 14. At the same time that SCR 16 is turned on, the gating signal is removed from the gate of SCR 11, if it has not already been removed, but because SCR 11 has been conducting load current, it does not turn off completely instantaneously. Thus, immediately after the commutating SCR 16 is turned on, both SCR 11 and SCR 16 are conducting, and the SCR 16 end of winding 18, which previously had been at full supply voltage, immediately drops to zero volts (assuming the negative supply terminal 14 is at ground potential). In the most general case, the tap point of inductance 18 may be located at any point intermediate the ends thereof, but for many applications it is preferably center tapped. Since the voltage across the lower half in inductance 18 rapidly rises to the full supply voltage, the SCR 11 end of winding 18 at this instant of time is at twice the supply voltage due to the autotransformer action of winding 18, thereby reverse biasing SCR 11. The load current $i_L$, which before the start of the commutating interval flowed through SCR 11 and inductance 18, is switched to the commutating capacitors also immediately after the start of the commutating interval, being delayed only by circuit inductance while capacitor current reaches the value of load current $i_L$. The second condition determining the value of the inductance of winding 18 is that it or inductors 19 and 21 be sufficiently large to limit the current inrush to capacitor 20 caused by such switching action. Commutating capacitors 20 and 22 are sufficiently large so that the voltage rise across capacitor 20, during the commutation interval takes a sufficiently long time to charge to one half of the supply voltage to allow an adequate commutation time. The commutation interval for SCR 11 is determined by the time for capacitor 20 to charge to the voltage $ES/2$ at which time the center tap of winding 18 is also at voltage $ES/2$ and the SCR end thereof has been reduced to ES, thereby completing the interval of reverse bias of SCR 11 so that by this time SCR 11 should be completely commutated off. Although winding 18 is ideally designed to have no leakage inductance, as a practical matter there will be a slight leakage inductance present. The leakage inductance of winding 18 and the inherent circuit inductance which cannot be eliminated may be used in place of inductances 19 and 21. Slight oscillations of the voltage at the tap point of winding 18 both during and after commutation will occur at this point in the operation; however, such oscillations are rapidly damped out by the effects of resistance in the load circuit.

After SCR 11 has been completely commutated off, capacitor 20 continues to charge toward the voltage $E_s$ and capacitor 22 to discharge toward $-E_s$. SCR 16 is automatically commutated off when capacitor 20 charges to a voltage greater than $+E_s$ and capacitor 22 reverses in voltage due to energy stored in the filter circuits 15, 19 and 21. At this time the exciting current in inductance 18 drops to zero and SCR 16 turns off. Diode 17 then conducts in a direction from the power supply terminal 14 to the diode 17 end of winding 18. This latter conduction of diode 17 may be described as a coasting mode of operation whereby the load current is circulated within the diode 17-load circuit loop. The load current continues to circulate in the diode 17-load circuit loop due to the energy storage within filter circuit elements 15. The advantage of employing a filter circuit, as shown in FIGURES 1 and 3 is that load current continues to flow through load 12 even after current has ceased to flow in the diode 17. It can be appreciated that numerous other filter circuits may be employed in the load circuit, however, such filter circuits are well known and thus will not be illustrated. If the feedback diode 23 (shown in dotted lines in FIGURE 1) is used, the commutation operation of the circuit of FIGURE 1 is somewhat different from that described above where diode 23 is assumed not to be present in the circuit. With diode 23 present, during the commutating interval of time the voltage across inductance 18 is at full supply voltage, the center tap point at this instant of time is one-half of the supply voltage. Also, since both SCR 11 (or diode 23) and SCR 16 are conducting during this interval of time, the line current $i_s$ which flows from the positive terminal 13 passes through SCR 11, inductance 18, or capacitor 20 and inductor 18 and 19 and SCR 16 to the negative power supply terminal 14. During the commutation interval, an additional current $\Delta I$ will build up at a constant rate due to the impressed direct current supply voltage $E_s$ being applied across tapped inductance 18. Inductance 18, therefore, functions as a commutation interval current limiting reactor to limit DC current drawn from the power supply during the commutation interval and is designed such that it exhibits a minimum practical impedance to the load current while exhibiting a maximum practical impedance to the buildup of the additional current $\Delta I$ during the commutation interval. The rate of buildup of the commutation interval current $\Delta I$ is dependent upon the inductance $L_{18}$ of the tapped winding 18 and upon the value of the line voltage $E_s$ as set forth by the expression $di/dt = E_s/L_{18}$. At the end of the commutation interval $\Delta T$, this additional current will have the value $\Delta I = E_s/L_{18}\Delta T$, irrespective of the nature of the load. Accordingly, at the instant that SCR 11 is completely commutated off, the flux level in the core of center tapped winding 18 has built up from its precommutation level of $N_{18/2}L_L$ to a level of $N_{18}\Delta I + N_{18/2}I_L$, and the current that had been flowing in the upper half of winding 18 has to be transferred to the lower half of winding 18 (or to a secondary winding as will be discussed later). At this same instant, two major conditions must be satisfied upon the current being transferred to the lower half of winding 18. The first of these conditions is due to Lenz's law which requires that the flux level in inductance 18 be maintained at the value $N_{18}\Delta I + N_{18/2}I_L$, and the second condition requires that the commutating current flowing in inductances 19 and 21 be maintained to complete the commutation interval. Accordingly, at the instant that SCR 11 completes commutation, the tap point of inductance 18 drops from its mid-tap potential of $E_s/2$ to a potential that is determined by the requirements of Lenz's law as set forth above. For example, if the commutating interval current $\Delta I$ is very small, the voltage at the tap point will go to the negative DC potential $-E_s$, thereby assuming a condition where most of the effects of commutation are largely completed. The stored energy in the inductances 19 and 21 and in center tapped reactor 18 may cause a slight amount of oscillation of the voltage at the tap point, but such oscillation will die out due to the damping effect of resistance in the load circuit. This oscillatory circuit is comprised by elements 20, 19, 22, 21, 15, 12, and intermittently diode 17.

If in contrast to the above-defined condition, the commutating interval current $\Delta I$ is appreciable or even slightly greater than the load current, the load current $i_L$ will assume a value which will satisfy the condition required by Lenz's law cited above. Under these circumstances, the voltage at the tap point at the time that SCR 11 is completely commutated off will fall to a potential more negative than the value of the negative terminal of the direct current power supply $E_s$.

In the event that commutating interval current $\Delta I$ is appreciably larger than the load current, the potential at the tap point will tend to fall to a value considerably below the negative terminal of the direct current power supply $E_s$. Subsequently, as the commutating interval current $\Delta I$ decreases to zero, the potential of the tap point will rise toward the value of the negative terminal of the direct current power supply $-E_s$ and allow the load current $i_L$ to build back up to satisfy the requirements of Lenz's law. Upon reaching this condition, the voltage at the tap point rises to the potential of the negative DC supply $E_s$, and assumes a condition where the effects of commutation are largely completed. Again, if the commutating interval current $\Delta I$ is not too great with respect to the load current, the voltage at the tap point may oscillate due to the energy stored in the inductances 19 and 21 and reactor 18, but will be damped out by the effects of resistance in the load circuit.

During the commutation interval, commutating capacitors 20 and 22 discharge through inductances 19 and 21, respectively, since there exists a continuously decreasing difference in potential across these inductances during the commutation interval. The difference in potential across the inductances is brought about by the fact that the capacitor dot ends were initially at full supply voltage $+E_s$ and the voltage at the juncture of the inductances, being at the center tap point of winding 18 changed from $+E_s$ to $+\frac{1}{2}E_s$ at the start of the commutation interval. Thus, capacitors 20 and 22 continually discharge the inductances 19 and 21, respectively, through filter inductance 15 and load 12 during the commutation interval. Inductances 19 and 21 effectively slow down the rate of change of the potentials across capacitors 20 and 22 such that there is sufficient time duration to completely turn off SCR 11 before the dot end of the capacitors is reduced to the steady state value of the negative supply voltage. Since filter inductance 15 has a relatively high inductance value, the load current flowing therethrough remains relatively constant. The total commutation time for SCR 11 is the time in which capacitors 20 and 22 discharge sufficiently such that the discharge current flowing through inductances 19 and 21 increases to equal the load current $i_L$ previously supplied to the load by SCR 11. At such time when the full load current is supplied by the discharge of capacitors 20 and 22, SCR 11 no longer provides any current and, therefore, becomes nonconducting, that is, begins to be commutated off. The capacitor discharge currents flowing through inductances 19 and 21 continue increasing beyond the point of equalling the load current and such excess current applied to inductance 19 forces diode 23 to conduct (if present). The time of such excess current flow is sufficient to permit complete commutation of the SCR 11. After SCR 11 has become completely commutated off and the total current in inductances 19 and 21 is less than the load current, diode 17 is caused to conduct to circulate coasting current and such diode conduction develops a reverse bias across SCR 16 by reason of the forward voltage drop across diode 17, thereby automatically commutating off SCR 16. Diode 23, shown in dotted line form as connected across load current carrying SCR 11 in a reverse polarity sense, functions as a feedback diode and is generally preferred for use in the herein described circuits whereby current from the load circuit may be fed back into the power source. The inclusion of feedback diode 23 effectively clamps the potential of the cathode electrode of SCR 11 to the potential of terminal 13 when such point tries to go positive with respect to the positive terminal due to an inductive load circuit. As a result, current will be supplied back to the direct current power supply through feedback diode 23 and, hence, it is sometimes referred to as a pump back diode. Because the potential at the cathode of SCR 11 is clamped to the potential of terminal 13 by the feedback diode 23, the mode of commutation of SCR 11 is somewhat different as discussed hereinbefore. With such arrangement, a reverse bias is developed across SCR 11 by reason of the forward voltage drop across the feedback diode 23 while SCR 11 is being commutated. This voltage drop may be no more than one volt but it is sufficient to reverse the polarity of the potential across SCR 11 and cause it to turn off and return to its blocking condition. For either mode of commutation of SCR 11, the fact that the series connected inductances and capacitors 19, 21 and 20, 22, respectively, are tuned to series resonance at a substantially higher frequency than the lower circuit operating frequency permits the load current to be maintained through load 12 without substantial change in magnitude by sequential turning on and commutation of SCR 11.

The commutation circuit herein described provides a means for charging commutating capacitors 20 and 22 to either power supply voltage ($+E_s$ or $-E_s$) even in the no load condition of operation. Therefore, the power circuits herein described are assured commutation which is independent of load from a no load to full load condition of operation.

FIGURE 4 of the drawings illustrates the construction of a gating circuit suitable for use with the new and improved power circuit shown in FIGURE 1. In FIGURE 4, the load current carrying silicon controlled rectifier device 11 is shown as having its gate electrode connected to the secondary winding of a pulse transformer 26. The primary winding of pulse transformer 26 is connected between one base of a unijunction transistor 27 and the negative terminal 14 of the direct current power supply. The remaining base of the unijunction transistor 27 is connected through a voltage limiting resistor 28 to the positive terminal of the direct current power supply. The emitter electrode of the unijunction transistor 27 is connected to the junction of a resistor 29 and capacitor 30 connected in series circuit relationship between the negative terminal 14 and the collector electrode of PNP transistor 31. The transistor 31 has its emitter electrode connected directly to the positive terminal 13, and its base electrode is connected to a source of direct current control voltage $E_{con1}$ for controlling the phasing of the time of firing of the load current carrying SCR 11.

In order to control the time of firing of commutating SCR 16 at a fixed phase relationship with respect to the time of firing of the load current carrying SCR 11, the cathode of a blocking diode 32 is connected to the cathode of SCR 11. The blocking diode 32, in turn, has its anode connected to the juncture of a resistor 33 and capacitor 34 connected in series circuit relationship across terminals 13 and 14. The juncture of resistor 33 and capacitor 34 is also connected to the emitter electrode of a unijunction transistor 35 which has one base connected through a resistor 36 to the positive terminal 13, and the remaining base connected through the primary winding of a pulse transformer 37 to the negative terminal 14. The secondary winding of the pulse transformer 37 is connected to the gate electrode of the commutating SCR 16.

By reason of the above-described arrangement and nature of the unijunction transistors 27 and 35, which are avalanche devices in that they are rendered fully conducting upon the base to emitter voltage of the device reaching a predetermined level, gating pulses will be produced in the primary windings of the pulse transformers 26 and 37 in the following manner: The direct current control voltage $E_{con1}$ applied to the base electrode of the PNP transistor 31 causes this transistor to vary the value of the resistance of the resistance-capacitance network comprised by resistor-capacitor 29 and 30. This results in varying the rate at which the capacitor 30 is charged to a value sufficient to trigger on the unijunction transistor 27. Upon the unijunction transistor 27 being triggered on, a gating pulse will be produced in the secondary winding of pulse transformer 26 which turns on the load current carrying SCR 11. Upon the load current carrying SCR 11 being turned on, the juncture of the cathode of SCR 11 and tapped inductance 18 is driven to the positive potential of terminal 13 so that blocking diode 32 is rendered blocking. Upon diode 32 being blocked, capacitor 34 will be charged up through resistor 33 towards the potential of terminal 13 at a rate determined by the time constant of the resistor 33 and capacitor 34. This charging rate can be designed to provide a sufficient potential across the capacitor 34 at a predetermined time interval after load current carrying SCR 11 is turned on to cause the unijunction transistor 35 to be turned on. This results in producing a gating pulse in the secondary winding of pulse transformer 37 to thereby turn on commutating SCR 16 at the desired fixed interval of time after load current carrying SCR 11 was turned on. This fixed time mode of operation of turning off SCR 11 can also be accomplished by connecting the cathode of blocking diode 32 to the tap point of inductance 18 or to the juncture of inductance 18 and anode of SCR 16 instead of the juncture of SCR 11 and inductance 18 as illustrated.

Figure 5:
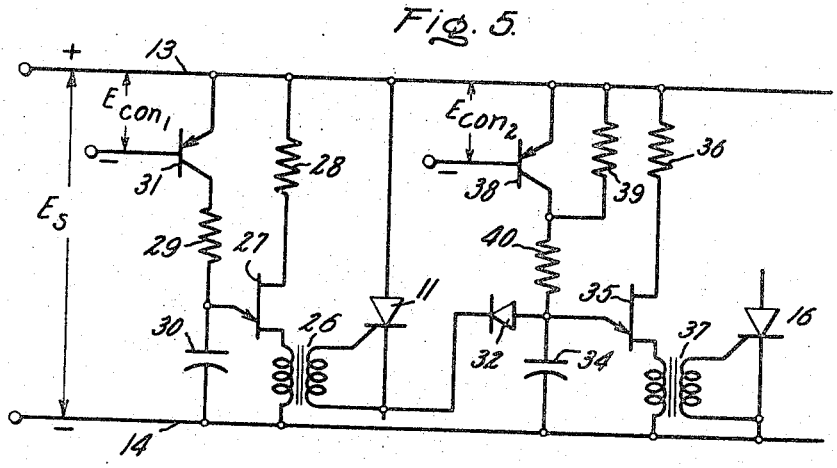
FIGURE 5 is a detailed circuit diagram of a modification of the gating circuit shown in FIGURE 4 to provide independent control over the commutation operation as well as independent control of the turn on of the load current.

FIGURE 5 of the drawings illustrates a variation of the circuit shown in FIGURE 4 wherein independent control is provided over the firing of the commutating SCR 16, that is, a variable frequency mode of operation may be obtained. This independent control of the firing of commutating SCR 16 is achieved by the substitution of an additional PNP transistor 38 paralleled by a resistor 39 and connected in series circuit relationship with resistor 40 in place of the fixed resistor 33 shown in FIGURE 4. By this modification, variation of the conductance of transistor 38, resistor 39, and resistor 40 thereby varies the charging rate of capacitor 34. This, in turn, varies the time at which the unijunction transistor 35 is turned full on, resulting in gating on the commutating SCR 16 with respect to the turn-on time of the load current carrying SCR 11. If desired, other forms of suitable firing circuits for the power circuit arrangements described may be used, such as those disclosed in chapter 9, entitled "Inverter and Chopper Circuits" of the Silicon Controlled Rectifier Manual, published by the General Electric Company, Rectifier Components Department, copyrighted in 1961.

The output of a power circuit employing the gating circuit shown in FIGURE 4 may thus be changed only by varying the frequency of turn on of SCR 11, that is, by changing the magnitude of the direct current voltage $E_{con1}$. The output of a power circuit employing the circuit shown in FIGURE 5, however, may be changed by varying the "on" time or "off" time, or both, of SCR 11, thereby permitting a change in the output at either constant or variable frequency, that is, by changing the magnitude of the direct current voltages $E_{con1}$ and $E_{con2}$.

Figure 6:
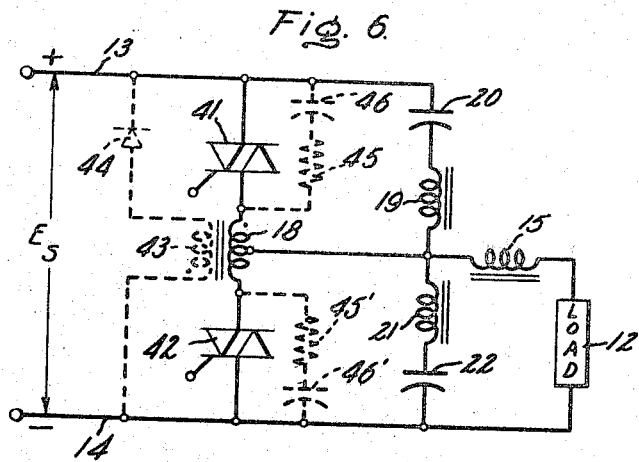
FIGURE 6 is a detailed circuit diagram of a modification of the circuit shown in FIGURE 1 and employs triacs in place of the silicon controlled rectifiers and diodes.

FIGURE 6 of the drawings illustrates a modification of the time-ratio control power circuit shown in FIGURE 1 wherein the load current carrying SCR 11 and feedback diode 23 are replaced by a first gate turn-on, nongate turn-off solid state triac bidirectional conducting device 41, and the commutating SCR 16 and coasting diode 17 are replaced by a second such triac device 42. The triac is a gate turn-on, nongate turn-off, bidirectional conducting device which has been newly introduced to the electrical industry by the Rectifier Components Department of the General Electric Company, Auburn, N.Y. Similar to the SCR, the triac may be switched from a high impedance blocking state to a low impedance conducting state when a low voltage gate signal is applied between the gate terminal and one of the load terminals. Also, like the SCR, once the triac is switched to the low impedance conducting state, the gate electrode loses control and current flow through the device must be interrupted by some external means while the gate signal is removed in order to return the triac to its high impedance blocking state. A further characteristic of the triac is that once it is gated on, it will conduct current through the device in either direction, depending upon the polarity of the potential across the device. For a more detailed description of the triac gate turn-on, nongate turn-off solid state semiconductor device, reference is made to an article entitled "Bilateral SCR Lets Designers Economize on Circuitry" by E. K. Howell appearing in the Jan. 20, 1964, issue of Electronic Design magazine.

In the FIGURE 6 embodiment, an additional winding 43 is tightly coupled to each portion of tapped winding 18 such that inductance 18 which previously functioned as an autotransformer is now a transformer having a tapped primary and a secondary winding all being tightly inductively coupled. Secondary winding 43 is connected in series circuit relationship with a blocking diode 44 and the series circuit formed by the secondary winding 43 and diode 44 is connected in parallel with the series circuit comprised by tapped inductance 18 and the two triac devices 41 and 42. The inclusion of secondary winding 43 and blocking diode 44 is preferred for use in conjunction with inductive loads since it is better able to cope with the reactive component of the load current stored in the load circuit, as well as the excess energy built up during the commutating interval. This feature can, of course, be incorporated in the embodiment of the circuit shown in FIGURE 1, or in any of the hereinafter illustrated circuits, but for purposes of simplification will not be illustrated in most of the figures. Construction of the circuit to include this feature allows excess energy drawn from the power supply during commutation to be recirculated back into the power supply thereby conserving the energy and greatly improving the efficiency of the power circuit. In operation at frequencies which are low with respect to the commutating frequency, the commutating current flows out of commutating capacitors 20 and 22 as they become discharged to attain their new steady state level in the manner described in relation to the circuit shown in FIGURE 1. Similarly, because the full value of the direct current power supply voltage is impressed across inductance 18 during the initial interval when both triac 41 and triac 42 are conducting, an additional current $\Delta I = (E_s/L_{18}) \times \Delta T$ will be built up during the commutating interval in the manner described with relation to the circuit shown in FIGURE 1. Here again, this additional current $\Delta I$ is minimized because the reactor 18 is designed to exhibit a minimum practical impedance to the load current while exhibiting the maximum practical impedance to the buildup of the additional current $\Delta I$ during the commutating interval.

The operation of the power circuit with a filter inductance 15 conected in the load circuit represents the most severe condition presented for commutation since with an inductive load circuit it is necessary that the commutation current not only perform the operation of turning off the load current carrying device, but in addition, it must supply current to the load during a portion of the commutation interval. This is caused by the nature of the inductive load circuit. At the instant of time just prior to commutation, the flux level built up in the center tapped winding 18 was equal to $N_{18}I_L$ and a net increase of flux due to the buildup of the commutating interval current $\Delta I$ occurs during the commutating period $\Delta T$ in the manner described in relation to FIGURE 1. Thus, in the FIGURE 6 embodiment, it is necesssary that the secondary winding 43 conduct in order to maintain the flux level of the center tapped winding 18. For this to happen, the tap point of inductance 18 must drop below the value of the negative terminal of the direct current power supply in order to render diode 44 conductive. With the potential of the tap point below the negative terminal of the direct current power supply, the voltages across inductances 19 and 21 are increased thereby allowing more commutating current to be drawn from the commutating capacitors 20 and 21. The additional commutating current also flows in the lower half of winding 18 and builds up to a maximum before it begins to sinusoidally decay towards zero at a frequency which is approximately the same as the commutation frequency since only a small leakage inductance of the lower half of winding 18 is seen when the secondary winding 43 is conducting. At the instant the commutating current reaches the value of the load current and begins to increase above that value, the energy stored in the filter inductance 15 begins to supply current through triac 42 back through the lower half of winding 18 into load 12. This flow of current in the reverse direction through the lower half of winding 18 requires that the secondary winding 43 conduct even more current than before in order to maintain the flux level of the center tapped winding 18. For this reason, diode 44 will remain conducting until the core of the center tapped inductance 18 has been reset by the net ampere turns being reduced so that the flux level in the core is determined primarily by the load current. Once the core has been reset, the major effects of commutation are completed and the load current flows to the load through triac 42. Thus, the practical effect of the series circuit comprising secondary winding 43 and diode 44 is to limit the negative potential to which the tap point of the inductance 18 may drop and also to feed back the excess commutating energy to the power lines. A series connected resistance-capacitance network 45, 46 may also be connected across triac device 41 and a second series connected resistance-capacitance network 45', 46' may be connected across triac device 42 to limit the rate of rise of reapplied voltage across such triacs, if desired. The series connected secondary winding 43 and diode 44 and the series connected resistance-capacitance networks 45, 46 and 45', 46' may also be employed with the conventional silicon controlled rectifier devices illustrated in FIGURE 1 and the other turn-on, nongate turn-off solid state conducting devices to be disclosed hereinafter.

Figure 7:
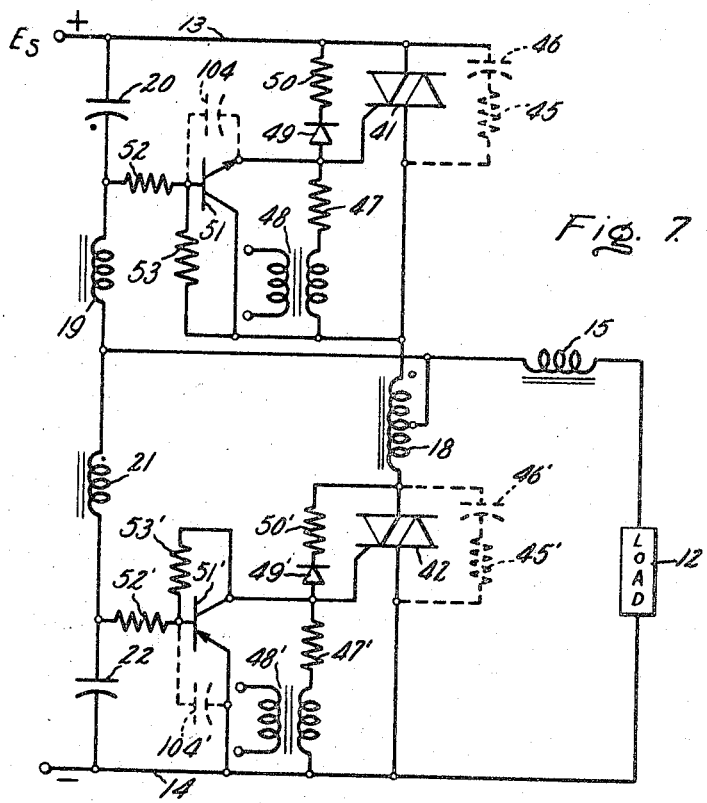
FIGURE 7 is a detailed circuit diagram of the circuit shown in FIGURE 6 including the details of the triac gate firing circuits.

FIGURE 7 of the drawings illustrates the circuit shown in FIGURE 6 in greater detail. For purposes of illustration, triac 41 may be described as load current gate turn-on, nongate turn-off solid state triac bidirectional conducting device 41. The control gate of triac 41 is connected through a limiting resistor 47 and pulse transformer 48 to a source of control gating on signal pulses which as one example may comprise the input to pulse transformer 26 in FIGURE 4. For a purpose that will be discussed more fully hereinafter, the control gate of triac 41 is also connected to the anode of diode 49 whose cathode is connected through limiting resistor 50 to the positive terminal 13. In addition to these connections, clamping circuit means are provided for clamping off the gate of triac 41 during the commutation of this triac. For this purpose, the control gate of triac 41 is connected to the emitter electrode of an NPN junction transistor 51. The collector electrode of transistor 51 is connected directly to the negative or cathode terminal of the triac device 41, and the base electrode is connected through a limiting resistor 52 to the juncture of the commutating capacitor 20 and linear inductance 19. For the purpose of limiting the rate of rise of reapplied voltage across the triac 41 when it is commutated off, a limiting resistor 45 and series connected capacitor 46, shown in dotted line form, may be inserted between positive terminal 13 and the negative electrode or cathode of triac device 41, if desired. Alternatively, the limiting resistor and series connected capacitor may be employed if triac 41 is particularly susceptible to $dv/dt$ firing.

For purposes of simplification, triac device 42 may be described as a coasting and pump back, gate turn-on, nongate turn-off solid state triac bidirectional conducting device. Similar to triac 41, triac 42 likewise has its gate electrode connected through limiting resistor 47' and pulse transformer 48' to a second source of gating control signals which as one example may comprise the input to the primary winding of pulse transformer 37 in FIGURE 4 or 5. The control gate of triac 42 is likewise connected through diode 49' and limiting resistor 50' back to the positive terminal or anode of the triac device 42. Further, the control gate of triac 42 is connected to a clamping circuit means comprised by PNP junction transistor 51' whose emitter electrode is connected directly to the negative terminal or cathode of the triac device 42 and whose collector electrode is connected to the gate of triac 42. The base electrode of transistor 51' is connected through a limiting resistor 52' to the juncture of commutating capacitor 22 and linear inductance 21. A series connected resistance-capacitance network 45', 46' may be connected across triac device 42 to limit the rate of rise of reapplied voltage across triac 42, if desired. Resistors 53 and 53' are connected between the collector and base electrodes of transistors 51 and 51', respectively, to provide turn-on of transistors 51 and 51' when there is no voltage across capacitors 20 or 22, respectively.

In operation, the circuits of FIGURES 6 and 7 operate similar to the circuit of FIGURE 1 in many respects but, in addition, are capable of performing one additional function. That is, the circuits of FIGURES 6 and 7 are capable of operating in a first mode where current is supplied to the load device 12 from the power supply, and also are capable of operating in a second mode where load 12, which for example, might constitute an electric trolley coasting down hill, is employed as a generator to pump electric power back into the power supply connected across terminals 13 and 14. The first mode of operation where load 12 is being supplied power from the direct current power supply will be described first.

Assuming that triacs 41 and 42 are each initially in their nonconducting or blocking states, then commutating capacitor 20 is fully charged to essentially the full potential $E_s$ of the direct current power supply. Upon load current carrying triac 41 being gated on by the application of a gating on signal to the gate thereof from pulse transformer 48, load current flows through triac 41, the upper half of linear inductance 18, filter inductance 15, and load 12 in precisely the same fashion as the SCR circuit described previously. Thereafter, just prior to the time that is desired to commutate off triac 41, triac 42 will be gated on by a gating signal pulse applied to its gate by transformer 48'. Upon this occurrence, commutating capacitors 20 and 22 charge and discharge respectively in a damped oscillatory manner through linear inductances 19 and 21 and the load circuit to turn-off triac 41 in the manner previously described in connection with FIGURE 1. During the oscillatory discharge of commutating capacitors 20 and 22, the dot side of inductor 18 is driven positive with respect to terminal 13 which may tend to produce a gating on signal on the gate of triac 41 during the commutation interval. However, this positive potential is supplied also through limiting resistor 53 to the base electrode of NPN transistor 51 to cause this transistor to become fully conductive and thereby clamp the gate of triac 41 to the potential of the negative or cathode electrode of triac 41.

The circuits of FIGURES 6 and 7 will now be considered in their second mode of operation, that is, when load 12 might be, for example, an electric trolley car that is coasting down hill and, hence, generating current. Under these conditions, it is desirable to supply the current generated by load 12 back into the direct current power supply. When operating under these conditions, load current carrying triac 41 is initially in its blocking condition and coasting triac 42 is periodically turned on and off by the application of a suitable gating-on signal to the input terminals of pulse transformer 48'. When thus turned on, coasting triac 42 will be commutated off by the operation of the commutation circuit means 18 through 22 in the manner previously described with relation to FIGURE 1. Each time that the triac 42 is gated on, filter inductance 15 will be charged with the current from load 12 which in this mode of operation of the circuit is acting as generator and, hence, will be referred to as load generator 12. Upon coasting triac 42 being commutated off, the potential across filter inductance 15 adds to the potential of the load generator 12 to drive the potential of the tap point of inductance 18 positive with respect to terminal 13. This causes triac 41 to conduct current in the feedback direction by reason of the application of a gating pulse to the gate electrode thereof by means of the diode 49-resistor 50 circuit and transistor 51 being turned off by the voltage at the dot end of capacitor 20 being substantially below the voltage of terminal 13. With triac 41 having high impedance during commutation, excessive energy stored within elements 19–22 is passed to load 12 without additional oscillation caused by diode 23 in the circuit of FIGURE 1. Power will then be pumped back from the load generator 12 through filter inductance 15 until such time that the filter inductance 15 is discharged sufficiently to allow the potential of the tap point of inductance 18 to drop to a value equal to or slightly below the value of potential of terminal 13. This results in reversing the polarity of the potential across triac 41, turning it off, and allowing it to resume its blocking condition. Upon this occurrence, the circuit resumes its original condition thereby completing one cycle of the second mode of operation, and the coasting and feedback triac 42 can then be again gated on in the feedback direction to initiate a new cycle.

A further circuit improvement may be obtained by adding capacitors 104 and 104' shown in dotted line form between the base and emitter electrodes of transistors 51 and 51', respectively. The function of the added capacitors is to maintain transistor 51 or 51' in a conductive state during the interval that oscillations occur after commutation of triac 41 or 42. This feature allows use of higher resistance for resistors 52 and 52', resulting in less current drain on capacitors 20 and 22 and permitting smaller components for resistors 52 and 52'.

From the above description, it can be appreciated that by reason of the bidirectional conducting characteristic of triacs 41 and 42, the circuit of FIGURE 7 can be operated in either one or two modes to supply current to a load 12 or to feed current generated by a load generator back to the power source as determined by the conditions of operation of the load. It, therefore, can be appreciated that the circuit of FIGURE 7 makes a highly efficient time-ratio control power circuit for use with traction motors, for example, used in driving electrically operated vehicles.

Figure 8:
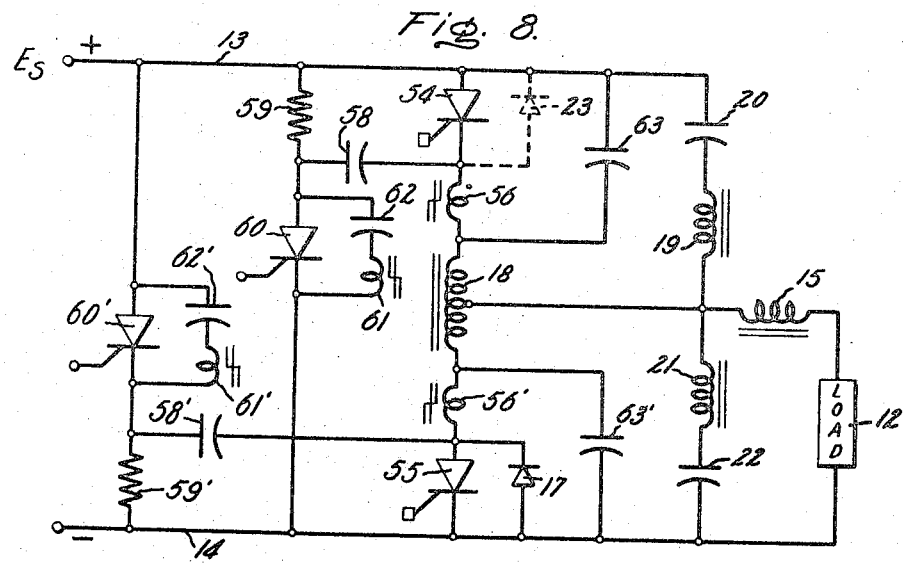
FIGURE 8 is a detailed circuit diagram of a new and improved time-ratio control circuit employing $dv/dt$ fired SCR's and a new and improved commutation scheme comprising a part of our invention.

FIGURE 8 of the drawings shows a different form of a new and improved time-ratio control power circuit constructed in accordance with the invention. The embodiment of the invention shown in FIGURE 8 is similar to the circuit of FIGURE 1 and identical insofar as construction and operation of the communication circuit means and load circuit is concerned, and hence these two components will not be again described. However, in place of the gate turn-on, nongate turn-off solid state silicon controlled rectifier devices 11 and 16 used in the circuit of FIGURE 1, nongate turn-off solid state $dv/dt$ fired silicon controlled rectifiers 54 and 55, respectively, are employed in the circuit arrangement of FIGURE 8. The silicon controlled rectifiers 54, 55 may each be a conventional gate turn-on silicon controlled rectifier wherein the gate is open-circuited, and a technique known as $dv/dt$ firing of the silicon controlled rectifier is employed to render it conducting. For this purpose, the nongate turn-on silicon controlled rectifiers 54 and 55 are connected in series circuit relationship with small saturable reactors 56 and 56', respectively. The small reactors each serve a pulse shaping function in that their presence steepens the trailing edge of a square wave firing pulse applied across SCR's 54 and 55, thereby assuring that the firing voltage is removed from the nongate turn-on SCR's as quickly as possible after they turn on. Isolation between the two firing circuits is achieved by means of a pair of isolation capacitors 63 and 63' connected between terminal 13 and the juncture of reactor 56 and inductance 18, and between the juncture of inductance 18 and reactor 56' and terminal 14, respectively.

In order to turn on the open-circuited gate SCR 54 and supply load current to the load 12, firing circuit means are provided which include a pulsing capacitor 58 having one terminal connected to the juncture of the nongate turn-on SCR 54 and the small saturable reactor 56. The remaining terminal of the pulsing capacitor 58 is connected between the juncture of resistor 59 and a small third auxiliary gate turn-on SCR 60 back to the negative terminal 14. The other end of resistor 59 is connected to the positive terminal 13. The third auxiliary SCR 60 has a commutation circuit means comprised by a series connected saturable reactor 61 and commutating capacitor 62 connected in parallel circuit relationship therewith for commutating off the third auxiliary SCR 60 in the manner of a conventional circuit commutation operation. Since only a small (low current rating) auxiliary SCR 60 is required, the components of the firing circuit means likewise can be small and relatively inexpensive.

Similar to open-circuited gate SCR 54, SCR 55 likewise is provided with a firing circuit means comprising pulsing capacitor 58', resistor 59', and a small fourth auxiliary gate turn-on SCR 60'. The commutation circuit means for SCR 60' is in like manner a series connected saturable reactor 61' and commutating capacitor 62' connected in parallel circuit relationship therewith.

In operation, the circuit of FIGURE 8 functions in the following manner. The nongate turn-on SCR 54 is in its blocking condition, in which event, the pulsing capacitor 58 will be charged to essentially the full potential of the direct current power supply through load 12, filter inductance 15, upper half of tapped inductance 18, saturable reactor 56 and resistor 59. This operation will function to drive the saturable reactor 56 into positive saturation so that the potential across it is positive at the dot end. With the circuit in this condition, the third auxiliary SCR 60 is in its blocking condition. At the point in time when it is desired to supply load current to the load 12, a gating on signal is supplied to the gate of the small third auxiliary SCR 60. Upon SCR 60 being rendered conductive, charged capacitor 58 attempts to discharge through the now conducting third auxiliary SCR 60, load 12, filter inductance 15, upper half of tapped inductance 18, and saturable reactor 56. The saturable reactor 56, however, unsaturates and temporarily holds off the potential of capacitor 58 for a short period of time. As a consequence, the juncture of capacitor 58 and reactor 56 and, hence, the cathode potential of SCR 54 is quickly driven to a negative potential substantially double that of the negative bus 14. This results in applying a very steep pulsed square wave shaped potential across the nongate turn-on SCR 54. This very steep pulsed square wave potential provides a very large change in voltage across SCR 54 in a very short time and, thus, has a high $dv/dt$. The high $dv/dt$ voltage pulse in effect causes an avalanche conduction condition through the nongate turn-on SCR 54, thereby turning it full on almost instantaneously. Thereafter, the saturable reactor 56 is immediately driven back into positive saturation so that the high potential across SCR 54 is immediately removed to avoid possible damage to the SCR 54 and returns the SCR to normal operating conditions. The SCR 54 then continues to conduct and to supply load current to load 12 for a desired interval of time. When it is desired to commutate off the SCR 54, auxiliary SCR 60' is turned on and renders nongate turn-on SCR 55 conductive as described in relation to the turning on of SCR 54. The conduction of SCR 55 operates in the manner described with relation to the circuit shown in FIGURE 1 to turn off SCR 54. In the interim, the commutation circuit means 61, 62, associated with the small third auxiliary SCR 60, has turned off SCR 60 and commutation circuit means 61', 62' has turned off SCR 60' so that the circuit is then returned to its initial quiescent condition ready for another cycle of operation. It should be noted that during the commutation operation, the coasting diode 17 and feedback diode 23 function in precisely the same manner as diode 17 and diode 23 in the arrangement shown in FIGURE 1.

Figure 9:
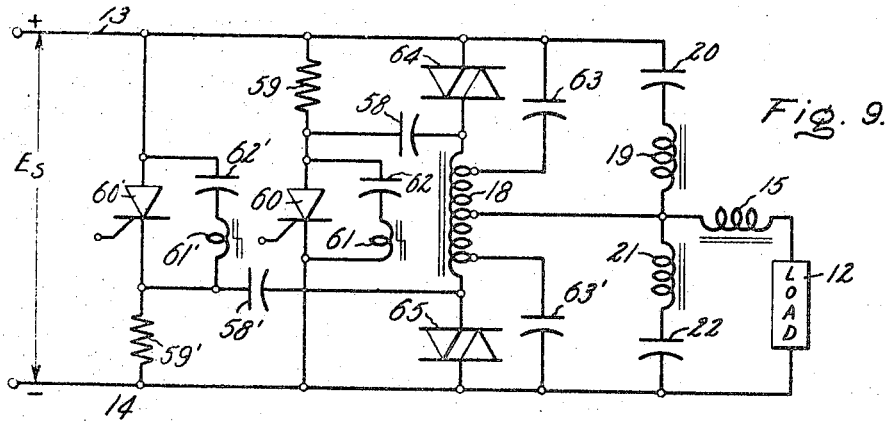
FIGURE 9 is a detailed circuit diagram of a modification of the circuit shown in FIGURE 8 and employs bidirectional conducting diacs in place of the $dv/dt$ fired SCR's and, in addition, illustrates a different form of capacitor isolation between the two firing circuits.

FIGURE 9 of the drawings illustrates still a different form of a new and improved time-ratio control power circuit constructed in accordance with my invention. Again in FIGURE 9, nongate turn-on, nongate turn-off solid state conducting devices 64, 65 are employed; however, in the circuit arrangement, these controlled conducting devices are each a bidirectional conducting device which is termed a power diac. The power diac is essentially an NPNPN, five-layer junction device capable of conducting currents as large as 100 amperes in either one of two directions through the device, dependent upon the polarity of the potential applied across the device. The power diac is triggered from its blocking or low conductance condition to its high conducting condition by the application of a high $dv/dt$ firing pulse across its terminals similar to the $dv/dt$ fired SCH's of FIGURE 8. It should be noted that the power diac referred to in this application is an entirely different device than its cousin the signal diac which is a low current, three-layer junction device designed to operate in the milliwatt region and used primarly in conjunction with gating circuit applications. For a more detailed description of the power diac devices 64 and 65, reference is made to an article entitled "Two Terminal Asymmetrical and Symmetrical Silicon Negative Resistance Switches" by R. W. Aldrich and N. Holonyak, Jr., appearing in the Journal of Applied Physics, vol. 30, No. 11, November 1959, pages 1819–1824. The embodiment of the invention shown in FIGURE 9 is similar to the circuit of FIGURE 8 and identical insofar as construction and operation of the firing circuits, commutation circuits, and load circuit are concerned, therefore, these circuits will not be described again in detail. The chief distinction between the circuits of FIGURES 8 and 9, other than the use of power diacs 64 and 65 for nongate turn-on SCR's 54 and 55, respectively, is the change in connection of the isolating capacitors 63 and 63'. In the FIGURE 9 embodiment, the isolating capacitors are connected at tap points adjacent the two respective ends of tapped linear inductance 18. Such connection permits simplification of the series circuit including diac 64, inductance 18, and diac 65 in that the small saturable reactors 56 and 56', shown in FIGURE 8, are no longer required for proper pulse shaping of the firing pulses. For the particular embodiment of FIGURE 9, winding 18 is of different design from the winding employed in the previous embodiments. In the previous figures, winding 18 is tightly coupled and approaches unity coupling. In the FIGURE 9 embodiment, the portions of the winding between each end and adjacent tap point, that is, the outer portions as illustrated, have a coupling factor with the inner portions of approximately 0.6 whereas the inner portions are tightly coupled together, approaching unity coupling. Due to the bidirectional conducting nature of diacs 64 and 65, feedback diode 23 and coasting diode 17 shown in FIGURE 8 are also no longer required in the FIGURE 9 embodiment. The bidirectional conducting nature of power diacs 64 and 65 permits the two modes of operation which are obtained with the circuits illustrated in FIGURES 6 and 7 wherein the load current is supplied to the load or fed back to the power supply.

At this point, it is appropriate to point out the advantages in employing the new triac and diac devices in our improved power circuits described herein. Taking as specific examples the SCR circuits illustrated in FIGURES 1 and 8 and assuming the use of feedback diodes 23 in order to return power from the load circuit back to the power supply, it can be appreciated that the commutation circuit elements 19–22 are selected to provide a peak total commutating current of $2I_L$. This design is necessitated by the fact that the commutating current, which is oscillatory in nature, has a value of one-half its peak value, that is, a value of $I_L$, at the 30° and 150° points of the alternating cycle. The value of commutating current in excess of load current $I_L$ for the duration between the 30° and 150° points of the alternating cycle is sufficient to cause full commutation of the SCR since this excess commutating current flows through diode 23 and thereby provides reverse bias across the SCR. The design of the commutation circuit elements 19–22 to develop the peak value of commutating current of $2I_L$ means that four times the normal energy is trapped in inductances 19 and 21 and this increases the magnitude of oscillations after commutation is complete. Further, at the time that the relatively large commutating current stops flowing through diode 23, a relatively steep $dv/dt$ voltage is developed across inductance 18 which may cause the SCR to reconduct by $dv/dt$ firing.

The use of triacs and diacs overcomes the above limitations of SCR's in the subject power circuits. In particular, the commutating energy stored or trapped in inductances 19 and 21 is reduced by one-fourth compared to the SCR embodiment since no commutation current in excess of the load current $I_L$ is required. This feature reduces the magnitude and number of oscillations occurring after commutation is complete. Further, the absence of excess commutation current flow through the triac or diac devices prevents the inadvertent reconduction of such devices by $dv/dt$ firing as in the case of SCR devices. This reconduction causes failure of circuit operation. Thus, after commutation of the diac or triac device is completed, commutating capacitors 20 and 22 do not have a diode 23 circuit through which to discharge and high $dv/dt$, during or after commutation, is prevented and safe operation is assured. The use of the bidirectional conducting devices, diacs, or triacs reduces the number of circuit components since the functions of feedback diode 23 and coasting diode 17 are now incorporated in the bidirectional nature of the diacs and triacs. Finally, inductances 18, 19, and 21 may be reduced in size since the root mean square current flow therethrough is less than the current flow in the corresponding inductances in the SCR circuits herein described. Since the nongate turn-on devices and $dv/dt$ fired SCR's have lower switching losses than the gate turn-on devices, triacs, or gate turn-on SCR's, when switching such devices to their conducting states, the nongate turn-on devices are especially useful in higher frequency applications.

Figure 10:
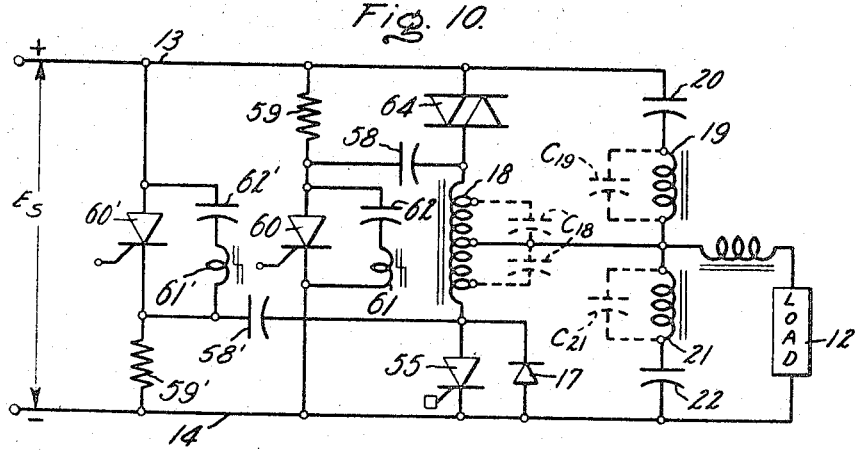
FIGURE 10 is a modification of the circuit shown in FIGURE 8 and uses a bidirectional conducting diac in place of one of the $dv/dt$ fired SCR's and, in addition, illustrates another different form of capacitor isolation between the firing circuits.

FIGURE 10 illustrates a still further embodiment of the time-rato control power circuit shown in FIGURE 8 wherein the nongate turn-on SCR 54 and feedback diode 23 are replaced by diac 64 in the manner illustrated in FIGURE 9. A further simplification of the isolating capacitor circuit shown in FIGURE 9 is attained in FIGURE 10 by selecting tapped linear inductance 18 and linear inductances 19 and 21 having sufficient distributed capacitances $C_{18}$, $C_{19}$, and $C_{21}$ (shown by dotted line), respectively, whereby the separate isolating capacitors 63 and 63' shown in FIGURES 8 and 9 are no longer required. Winding 18 may be of multilayer design and an overlapping layer on both ends thereof to provide the same relative couplings as winding 18 in FIGURE 9. In all other respects, the circuit shown in FIGURE 10 is identical in construction and operation to that described with relation to FIGURE 8 will not be described again in detail. The embodiment shown in FIGURE 10, as in the case of the embodiment of FIGURES 1 and 8 with diodes 23 connected in the circuit, is capable of two modes of operation, supplying load current to the load and pumping current from the load back into the power source.

Figure 11:
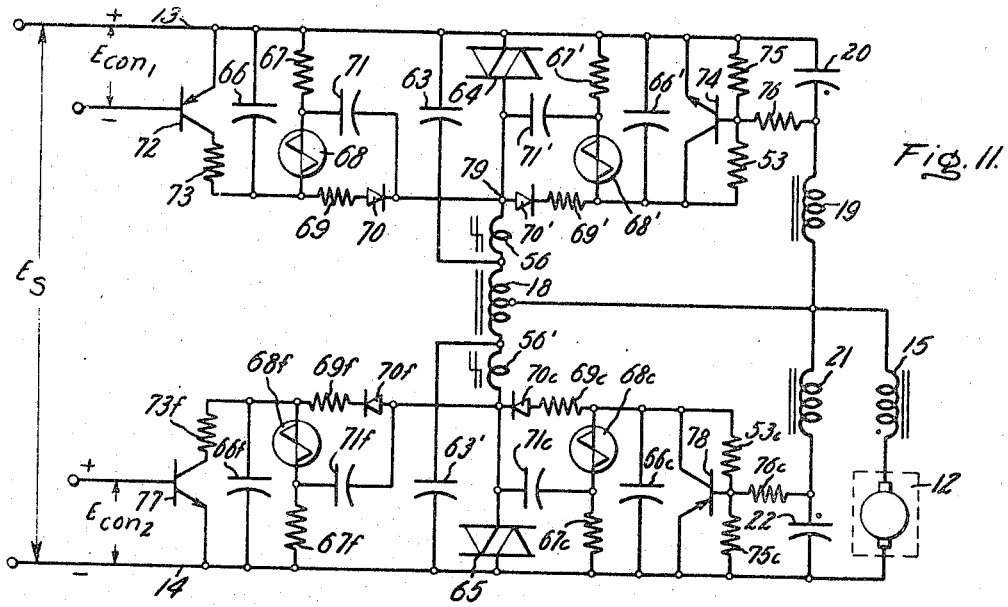
FIGURE 11 is a detailed diagram of a new and improved time-ratio control power circuit incorporating many of the features of the circuit shown in FIGURE 9 and, in addition, illustrates a different form of firing circuit means for turning on a diac or a $dv/dt$ fired SCR.

FIGURE 11 of the drawings illustrates still a different form of a new and improved time-ratio control power circuit constructed in accordance with our invention. Again in FIGURE 11 as in FIGURE 9, nongate turn-on, nongate turn-off solid state conducting power diac devices 64 and 65 are employed. Power diac device 64 is connected in series circuit relationship with small saturable reactor 56, the upper half of tapped linear inductance 18, filter inductance 15, and load 12 across the direct current power supply between terminals 13 and 14. Commutation circuit means are connected in circuit relationship with power diac devices 64 and 65 for commutating each of them off in sequence and thus returning each to its blocking condition and are comprised by linear inductance 18, commutating capacitors 20 and 22, and linear inductances 19 and 21. Since these commutation circuit means are identical in construction and operation to the commutation circuit means described with relation to FIGURE 1 of the drawings, it will not be described again in detail. Power diacs 64 and 65 may be triggered from their blocking or low conductance condition to their high conducting condition by employing the high $dv/dt$ firing circuit illustrated in FIGURES 8, 9, and 10; however, a different firing circuit will be illustrated with relation to FIGURE 11 to disclose still another example of the firing circuits which may be employed with our new and improved time-ratio control power circuits.

In order to turn on the power diac device and render it conductive when the terminal 13 is positive with respect to the tap point of inductance 18, a first load current firing circuit means is provided which is comprised by a pulsing capacitor 66 connected in parallel circuit relationship with a resistor 67 and a snap action switch turn-on controlled conducting means 68. This snap action turn-on controlled conducting means may comprise a smaller rated signal diac device mentioned above, a Shockly diode, or one of the bidirectional low current rated diode devices manufactured and sold by the Hunt Electric Company and known as a Hunt diode. The snap action switch 68 is similar to the diac device 64 in many of its characteristics; however, it will break down in an avalanche manner and be rendered fully conductive as long as current through switch 68 exceeds 50 milliamperes upon the application of a sufficiently high potential across the device. When thus fired, the rate of buildup of the firing potential, that is, its $dv/dt$, is not important. The snap action controlled conducting device 68 is connected in series circuit relationship with resistors 67 and 69 and diode 70. The series circuit thus comprised is connected between terminal 13 and the juncture of diac 64 and small saturable reactor 56. A coupling capacitor 71 is connected in parallel circuit relationship with snap action device 68, resistor 69, and diode 70. A PNP junction transistor 72 is connected in series circuit relationship with resistor 73 across pulsing capacitor 66. By this arrangement, conduction through the PNP junction transistor 72 controls the rate of voltage buildup across the pulsing capacitor 66. With transistor 72 turned full on, the voltage on capacitor 66 never builds up to a value sufficient to trigger on the snap switch device 68. By varying the rate of conduction through transistor 72, the rate of voltage buildup on the pulsing capacitor 66 can be controlled to control the point at which the snap switch device 68 is switched full on. Upon the snap switch device 68 being switched full on, the charge on capacitors 66 and 71 is connected in series circuit relationship between terminal 13 and the juncture of diac 64 and reactor 56, driving such juncture quickly negative with respect to terminal 13. This results in the production of sharp voltage pulse having a high $dv/dt$ across power diac device 64. As a consequence, power diac device 64 is turned on and conducts load current to load 12.

In addition to capacitors 66 and 71 and snap switch 68 and their associated components, the firing circuit means for power diac device 64 includes a second feedback firing circuit means for turning on diac device 64 in a reverse direction. This occurs when the polarity of the potentials of terminal 13 and the juncture of diac 64 and reactor 56 are reversed so that the juncture point is more positive than terminal 13 as to cause diac 64 to operate as a feedback diode in the manner of feedback diode 23 for the circuit arrangement shown in FIGURES 1 and 8.

The second firing circuit means for diac 64 is similar in construction and operation to the first firing circuit for diac 64 and for this reason the elements of the second firing circuit means have been given the same reference numeral as corresponding elements of the first firing circuit means. However, diac 65 is also provided with a first and second firing circuit means, each of which is similar in construction and operation to the firing circuit means associated with diac 64. Therefore, departing from the convention heretofore established, in order not to get too many primes after a numeral, the numerals of the second firing circuit means associated with diac 64 have been identified by a prime, the numerals of the first firing circuit means associated with diac 65 have been identified by a letter $f$ after them in order to indicate that they control turning on diac 65 during the power feedback mode of operation, and the numerals of the second firing circuit means associated with diac 65 have been identified by a letter $c$ in order to indicate that they control turning on diac 65 during the first mode of operation when power is supplied from the direct current power supply to load 12 and diac 65 serves a coasting diode function. The second or feedback firing circuit means associated with diac 64 is comprised by pulsing capacitor 66′, snap switch 68′, resistor 67′, capacitor 71′, resistor 69′, and diode 70′, all of which are similarly arranged and function in precisely the same manner as the identical numbered elements of the first load current firing circuit. The second feedback firing circuit differs from the first firing circuit, however, in the inclusion of NPN junction transistor 74 which is connected in a parallel circuit relationship with capacitor 66′ and has its base electrode connected to the juncture of a resistor voltage divider network. This resistor voltage divider network is comprised by a pair of resistors 75 and 76 connected in series circuit relationship across the commutating capacitor 20. Resistor 53 is connected between the collector and base electrode of transistor 74 to turn on transistor 74 when the voltage at the dot end of capacitor 20 is near the voltage of terminal 13. By this arrangement, as long as the potential on the dot side of commutating capacitor 20 is negative in respect to terminal 13, the NPN junction transistor 74 will be maintained full off so that the second firing circuit comprised in part by the pulsing capacitor 66′ can turn on the power diac 64 in the reverse or feedback current direction when the polarity of the potentials at terminal 13 and the juncture of diac 64 and reactor 56 (hereinafter juncture point 79) are reversed. For example, juncture point 79 becomes more positive than terminal 13 where there is motor load 12. Under such conditions, the diode 70′ will break down and conduct and charge pulsing capacitor 66′ to a level such that it turns on the snap switch device 68′. This produces a sharp voltage pulse in the previously described manner across power diac 64, thereby turning it on in a reverse or feedback current direction. The power diac 64 will continue to conduct in this direction until the potential at juncture point 79 drops to a value which is less positive than the potential of the terminal 13 whereupon the power diac device 64 shuts off automatically because of the reversal of potential across its terminals. However, it should be noted that while power diac 64 is conducting in the load current direction during the commutation interval when the potential across commutating capacitor 20 is such that the dot side of the commutating capacitor is near the voltage of terminal 13, the NPN junction transistor 74 will be turned on full by resistor 53 so as to shunt the capacitor 66′ and prevent the second firing circuit from turning on the diac 64 during the commutation interval.

The power diac 65 has a first firing circuit means connected thereacross, which is similar in construction and operation to the first firing circuit for power diac 64, and, hence employs similar elements functioning in the same manner. For example, the pulsing capacitor 66f for the coasting and feedback diac 65 corresponds to the pulsing capacitor 66 for the load current carrying diac 64. While operating the circuit in the feeding back of power mode of operation, diac 65 is turned on by the firing circuit comprising elements 66f through 71f, NPN junction transistor 77 and resistor 73f. During the first mode of operation of the circuit when power is being supplied from the direct current power supply to load 12, diac 65 must serve a coasting diode function. To operate diac 65 in this manner, a second firing circuit means is provided. The second firing circuit is similar to the second firing circuit associated with the load current carrying diac 64 for turning on diac 65 at appropriate intervals to serve a coasting function and comprises elements 66c through 71c, PNP junction transistor 78, and resistors 53c, 75c, and 76c.

There is one distinction, however, in the construction of clamping transistor 78 for clamping the potential of the pulsing capacitor 66c during the commutation interval when the voltage on the commutating capacitor 22 goes negative at the dot side of the capacitor. Because the potential on the commutating capacitor is negative at this point in the commutation interval, it should be noted that the transistor 78 is a PNP transistor in place of the NPN transistor 74 used in the second firing circuit associated with diac 64. In all other respects, the two second firing circuit means are constructed identically and operate in the same manner. Additionally, it should be noted that two small saturable reactors 56 and 56′ are connected between diac 64 and the upper end of tapped inductance 18, the lower end of inductance 18, and diac 65, respectively. The two small saturable reactors 56 and 56′ each serve a pulse shaping function in that their presence steepens the trailing edge of the square wave firing pulse applied across diacs 64 and 65, thereby assuring that the firing voltage is removed from the diacs as quickly as possible after they turn on. Isolation between the two firing circuits is achieved by means of a pair of isolating capacitors 63 and 63′ connected between terminal 13 and the juncture of reactor 56 and inductance 18 and between terminal 14 and the juncture of reactor 56′ and inductance 18, respectively.

Having described the construction of the FIGURE 11 circuit arrangement, its operation is as follows: Consider first that the circuit is in its quiescent condition where diacs 64 and 65 are both in their blocking condition and that the circuit is to be operated in the first mode of operation wherein load current is supplied to load 12. Diac 64 is rendered conducting in the following manner. With power diacs 64 and 65 initially being in their nonconducting or blocking condition, capacitor 71 will be charged to the full potential $E_s$ of the direct current power supply 13 through load 12, inductance 18, reactor 56, and resistor 67. Capacitor 66 will be similarly charged through load 12, inductance 15, upper half of inductance 18, reactor 56, diode 70, and resistor 69. During the previous operational cycle, the commutating capacitor 20 will have been charged also to essentially the full potential of the direct current power supply. With the circuit in this condition, a control potential $E_{con1}$ applied to the base of the PNP junction transistor 72 is adjusted so as to allow the potential buildup across capacitor 66 to increase at a rate such that snap switch 68 is closed or rendered conducting at a desired point in time determined by the load power to be delivered in accordance with the time-ratio control principles previously discussed with respect to FIGURES 2 and 3. Thereafter, the two capacitors 66 and 71, which at this point are effectively in series circuit relationship across diac 64 by reason of snap switch device 68 being turned on, produce a sharp firing pulse having high $dv/dt$ across diac 64 causing it to conduct. Load current will then be supplied to load 12 from the direct current power supply for as long as the power diac 64 is allowed to conduct in the load current direction. The period of load current flow to the load is determined in accordance with the above-mentioned time-ratio control principles.

Just prior to the time that diac 64 is to be rendered nonconducting, a control potential $E_{con2}$ is applied to the base of an NPN junction transistor 77 which then operates to cause diac 65 to conduct in the same manner as described above in relation to initiation of conduction of diac 64. The conduction of diac 65 operates in the manner described with relation to FIGURE 1 of the drawings to commutate off diac 64. During the commutation interval at the time that the charge on the commutating capacitor 20 is reversed so that its potential is positive at the dot side with respect to terminal 13, clamping transistor 74 will be turned full on so as to shunt the capacitor 66′ thereby preventing the second firing circuit from turning on diac 64 during the commutation interval. Thereafter, assuming that the load circuit is inductive, the current due to the collapse of the magnetic field around filter inductance 15 and load 12 causes juncture point 79 to rise to a potential which is positive with respect to terminal 13 thereby biasing diac 64 in a reverse polarity sense. This positive potential will be coupled through diode 70′ to cause the snap switch device 68′ to turn on. This results in effectively connecting capacitors 71′ and 66′ in series circuit relationship across diac 64 with polarity of the potentials of terminal 13 and juncture point 79 now reversed. At this point in time, the commutating capacitor 20 has been recharged such that the dot side of the capacitor is negative and transistor 74 is turned full off. Accordingly, the above action results in producing a voltage pulse across power diac 64 which causes it to turn on and conduct current in the reverse or feedback current direction. While conducting current in this direction, power diac 64 will pump current from load 12 and filter inductance 15 back into the direct current power supply in the well-known manner of a feedback diode. Thereafter, as filter inductance 15 and load 12 lose their charge, the potential of the juncture point 79 will drop until its polarity is reversed with respect to terminal 13, and diac 64 will be returned to its blocking condition. This results in returning the circuit to its initial operating condition and readying it for a new cycle of operation. It should be noted that just prior to the time that load current diac 64 is turned on in the reverse or feedback direction to function as a feedback diode, the coasting diac 65 is turned on by its second firing circuit comprised by elements 66c through 71c, PNP transistor 78, and resistors 53c, 75c, 76c so that it functions as a coasting rectifier. Turn on of the diac 65 in the coasting rectifier direction will precede turn on of the load current diac 64 in the feedback direction by a very discrete time interval. Commutation off of the diac 64 in its feedback direction will precede commutation off of the coasting rectifier diac 65 in the coasting direction by the interval of time between the time that the juncture point 79 goes to a less positive potential than the potential of terminal 13, and the time that diac 64 is again turned on in its load current carrying direction by the first firing circuit.

Having described the circuit of FIGURE 11 in operation with relation to its first mode of operation, it will now be described under conditions where load 12 might be an electrically driven vehicle which is coasting down hill and, hence, is acting as a generator. Under these conditions, it is assumed that both diacs 64 and 65 are initially in their nonconducting or blocking state, and that the potential of the juncture point 79 tends to go positive with respect to terminal 14. Concurrently, the commutating capacitor 22 will be charged positive at its dot side to essentially the full potential $E_s$ of the direct current power supply. Thereafter, at some predetermined rate determined by the amount of power to be pumped back to the direct current power supply, a control signal $E_{con2}$ applied to transistor 77 turns on the first firing circuit means associated with coasting and pump back diac 65 to cause it to be turned on. During turn-on, saturable reactor 56′ serves as a pulse shaping function to protect diac 65. Turning on of diac 65 immediately drops the potential of juncture point 79 to the potential of terminal 14 so that the load generator starts to charge filter inductance 15 in a direction such that the potential across it is positive at the dot end. Concurrently, the commutation circuit means comprised by linear inductance 21 and capacitor 22 tries to oscillate the potential on capacitor 22 to reverse its polarity and thereby drive inductance 21 towards its reverse polarity condition. The filter inductance 15 is charged for the period of time required for the inductance 21 to be driven into its reverse polarity condition, oscillates the charge on commutating capacitor 22 to thereby reverse its polarity, and again be driven back into its original polarity condition. Diac 65 is also commutated off during this period of time. During this commutation interval, transistor 78 clamps the potential across capacitor 66c to thereby prevent the application of a firing pulse to the diac during the commutation operation.

Upon diac 65 being commutated off during each operating cycle, the potential of the juncture point 79 rises to about double the potential of the direct current power supply due to series addition of the energy of the filter inductance 15 and load generator 12. As a consequence, load current carrying diac 64 is turned on by its second firing circuit when the diode 70′ turns on the snap switch 68′, thereby turning on diac 64 to conduct current in its feedback direction. Current is then pumped back into the direct current power supply for the period of time that juncture point 79 remains at a potential higher than the potential $E_s$ of terminal 13. At the time that the juncture point 79 drops below the potential of terminal 13, diac 64 is automatically commutated off and returns to its blocking condition thereby readying the circuit for a new cycle of operation. It should be noted that diacs 64 and 65 are essentially avalanche operated devices in that when they are turned on by $dv/dt$ firing in the above-described manner, they are rendered fully conducting across their entire cross section and thereby have lower switching losses than triacs. For this reason, diacs 64 and 65 are capable of operating at higher frequencies than the triac devices. For high frequency operations, the circuit of FIGURE 11 may be preferred over the circuit of FIGURE 7.

Figure 12:
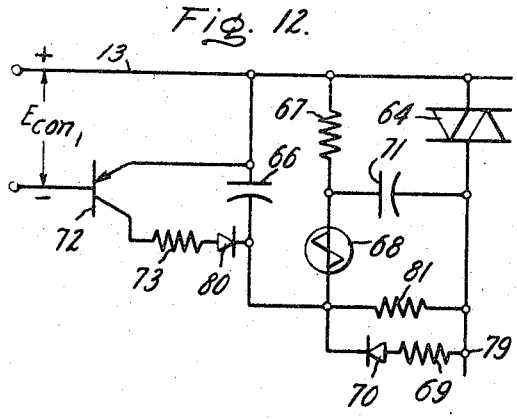
FIGURE 12 is a detailed circuit diagram of still a different form of firing circuit means for turning on a diac which uses common circuit elements to turn on the diac to conduct current in either one of two opposite directions.

FIGURE 12 of the drawings shows a different form of firing circuit for use with a time-ratio control power circuit of the type shown in FIGURE 11, for example, wherein the number of components is greatly reduced. In the circuit arrangement of FIGURE 12, the single circuit shown provides the turn-on functions for turning on the power diac 64 to cause it to conduct in either of the two directions. This simplification is achieved by the addition of a blocking diode 80 connected in the circuit branch of the PNP junction transistor 72 including resistor 73. Additionally, a charging resistor 81 is provided between the juncture point 79 and capacitor 66 with the connection of diode 70 being reversed so that its negative electrode or cathode is connected to the juncture of the snap switch device 68 and capacitor 66, and its positive electrode or anode is connected through resistor 69 to the juncture point 79. By this arrangement, when the terminal 13 is positive with respect to the juncture point (terminal) 79, the firing circuit functions in precisely the same manner as the first firing circuit described with relation to FIGURE 11 to cause the diac 64 to conduct current in what shall be termed the load current carrying direction from terminal 13 through the diac to terminal 79. When the polarities of terminals 13 and 79 are reversed so that terminal 79 is more positive than terminal 13, this positive potential will be transmitted through diode 70 to cause the capacitor 66 to be charged up at a rate determined by the time constant of capacitor 66 and resistor 69. During this occurrence, the blocking diode 80 will block the potential from being applied to the junction transistor 72. Thereafter, upon capacitor 66 reaching a sufficient voltage level, snap switch device 68 is turned on, and capacitors 66 and 71 will be effectively connected in series circuit relationship across diac 64. This produces a sharp voltage rise across diac 64 causing it to turn on and conduct a reverse or feedback current from terminal 79 through the diac to terminal 13.

Figure 13:
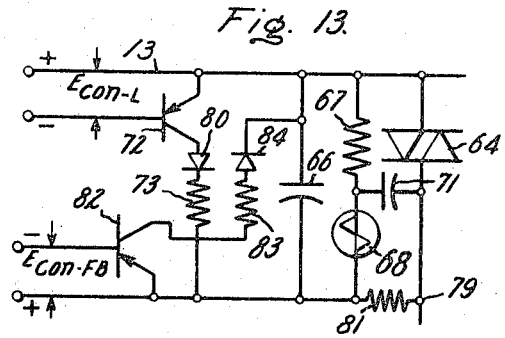
FIGURE 13 is a modification of the circuit shown in FIGURE 12 which provides independent control of the turn-on of the bidirectional conducting diac in either direction.

It should be noted that the gating circuit of FIGURE 12 as well as the gating circuit of FIGURE 11 both provide independent control over the time of turning on the power diac 64 in the forward direction only as determined by application of the control signal $E_{con1}$. There is no independent control over the timing of turning on the diac 64 in the reverse or feedback direction, however, since this occurs automatically whenever the voltage at juncture point 79 goes positive with relation to the terminal 13 unless blocked. In some applications, it may be desirable to independently control the timing of reverse or feedback current flow through power diac 64. For this purpose, the firing circuit of FIGURE 13 is provided. The firing or turn-on circuit of FIGURE 13 includes the resistor 67 and snap switch device 68 as well as the pulsing capacitor 66. In addition, the PNP junction transistor 72, resistor 73, and diode 80 are provided as well as resistor 81. It should be noted that in the embodiment of the firing circuit shown in FIGURE 13, resistor 81 may very well have a different value from the resistor 81 of the FIGURE 12 circuit. However, it serves the same function and, hence, has been given the same reference numeral. In the FIGURE 13 circuit, resistor 81 serves to couple the pulsing capacitor 66 across diac 64 and, hence, must have a value as small as possible so as not to dissipate this charge or to affect to a great extent the steepness of the applied potential developed across diac 64. In addition to these elements, an additional PNP junction transistor 82 has its collector connected through resistor 83 and diode 84 to terminal 13, and its emitter connected to the juncture of snap switch device 68 and resistor 81. Diode 84 has its negative electrode or cathode connected to terminal 13 and its positive electrode or anode connected to resistor 83. By this arrangement, conduction through either the junction transistor 72 or the junction transistor 82 controls the rate of buildup of voltage across the capacitor 66 and, hence, the time of firing of the snap switch device 68. Depending then upon the relative polarity of terminals 13 and 79, either one of the junction transistors 72 or 82 controls the time of firing of the circuit to thereby independently control the turning on of the power diac 64 in either direction. Thus, application of a control signal $E_{con-L}$ to the base transistor 72 turns on the power diac 64 in the forward or load current carrying direction, and application of a control signal $E_{con-FB}$ to the base of transistor 82 turns on diac 64 in the reverse of feedback direction. It should be noted that while the circuits of FIGURES 11 through 13 have been disclosed for use in conjunction with power diacs, they may be used also to trigger on $dv/dt$ fired SCR's. However, when thus used, they would not employ the reverse current firing feature.

Figure 14:
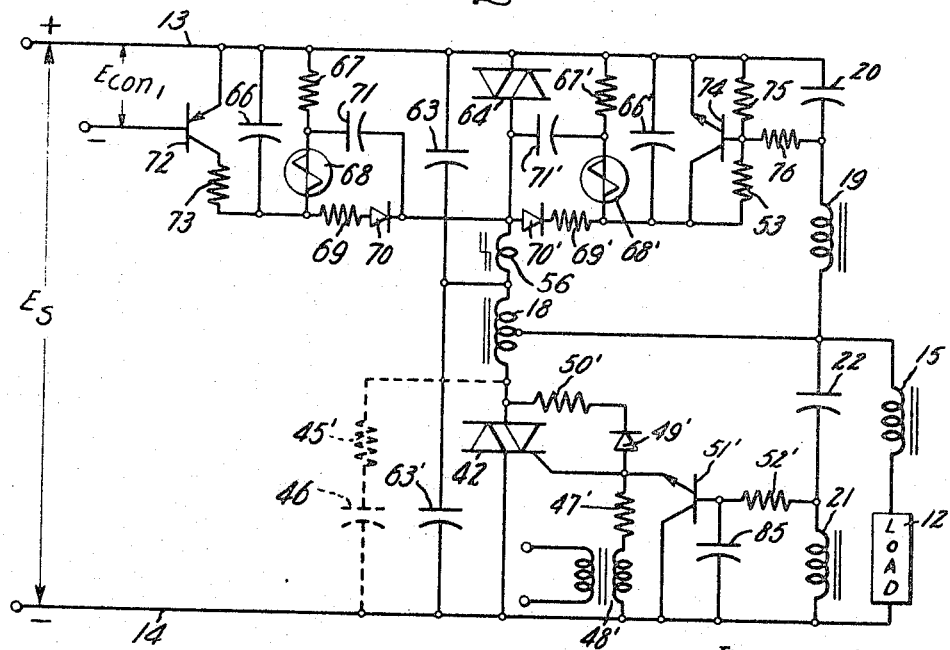
FIGURE 14 is a modification of the time-ratio control power circuit shown in FIGURE 11 with the exception that a bidirectional conducting triac is substituted for one of the diacs of FIGURE 11.

FIGURE 14 of the drawings illustrates still a different form of a new and improved time-ratio control power circuit constructed in accordance with my invention. The circuit shown in FIGURE 14 is in many respects similar to the time-ratio control power circuit shown in FIGURE 11 in that it employs a load current carrying turn-on, nongate turn-off power diac bidirectional conducting device 64 together with its associated firing circuitry and communication circuit means. The circuit of FIGURE 14 differs, however, from the FIGURE 11 circuit in that it employs a coasting and feedback gate turn-on nongate turn-off triac bidirectional conducting device 42 in place of the coasting and feedback diac device 65 used in the FIGURE 11 circuit. The coasting and feedback triac device 42 shown in FIGURE 14 includes gating circuit means comprised by elements 47′ through 52′ and capacitor 85, and commutation circuit means comprised by elements 18 through 22 which are similar in construction and operation to the similar means described with relation to the circuit of FIGURE 7 and, hence, will not be described again in detail. A distinction in the commutation circuit occurs in the reversal of positions of inductance 21 and capacitor 22 from that shown in FIGURE 7 and the other previously illustrated embodiments. This particular change in connection is used in certain applications wherein it is desired that one end of the inductance be connected to ground potential (the negative power supply terminal 14) and may also be employed in the other illustrated embodiments. The change in connection of inductance 21 and capacitor 22 requires changing transistor 51′ to an NPN junction type, adding a capacitor 85 between the base electrode of transistor 51′ and the negative power supply terminal 14, and eliminating the resistor 53′ shown in FIGURE 7. If desired, or if required because of the $dv/dt$ characteristics of triac 42, a circuit comprised by dotted resistor 45′ and dotted capacitor 46′ may be connected across the coasting and feedback triac 42 to limit the rate of rise of reapplied voltage across the device and thereby avoid undesired turning on of the device. Additionally, it should be noted that isolating means comprised by capacitors 63 and 63′ are included in the circuit arrangement of FIGURE 14 to minimize cross coupling between the load current carrying diac 64 and the coasting and feedback triac 42. In view of the fact that the operation of the load current carrying bidirectional conducting power diac 64 and the operation of the coasting and feedback bidirectional conducting triac 42 previously have been described in detail in connection with other time-ratio circuits herein disclosed, their operation in the circuit combination shown in FIGURE 14 is believed to be obvious and a further description is thought unnecessary.

Figure 15:
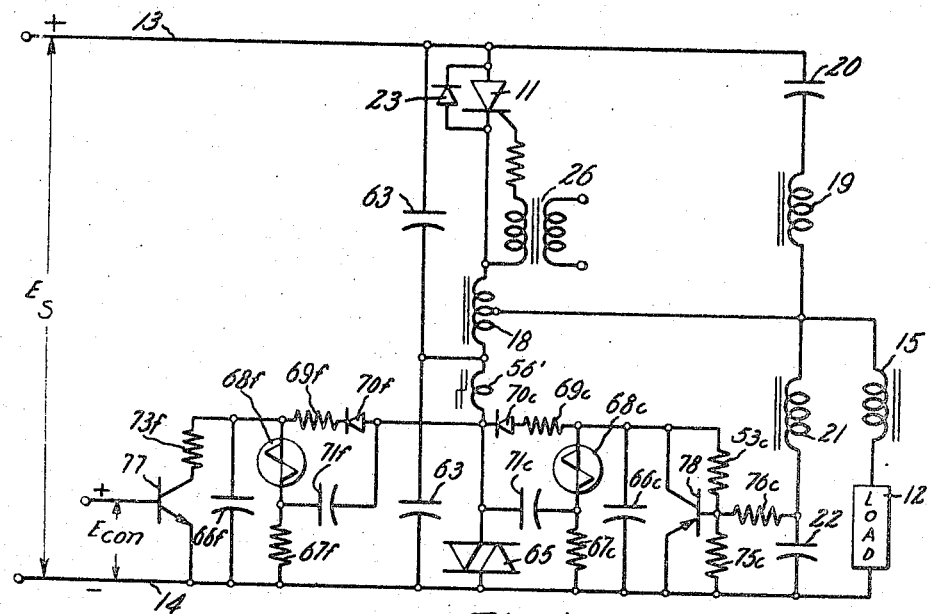
FIGURE 15 is a modification of the time-ratio control power circuit shown in FIGURE 11 with the exception that a conventional gate fired SCR is substituted for one of the diacs of FIGURE 11.

FIGURE 15 of the drawings shows still another form of time-ratio control power circuit constructed in accordance with our present invention. The circuit shown in FIGURE 15 is in many respects similar to the time-ratio control power circuit shown in FIGURE 11 but differs therefrom in that it employs a load current carrying conventional silicon controlled rectifier 11 and feedback diode 23 connected in place of the load current carrying power diac 64 employed in the FIGURE 11 circuit. The load current carrying SCR 11 is gated on by gating signal pulses applied from the secondary winding of a pulse transformer 26 connected to its control gate. The primary winding of pulse transformer 26 may be connected in a circuit similar to that shown in FIGURE 4 as an example. Silicon controlled rectifier 11 is commutated off by the new and improved commutation scheme including commutating capacitors 20, 22, linear inductances 19, 21 and tapped linear inductance 18. The coasting and feedback power diac 65 employs the same elements and operates in precisely the same fashion as the coasting and feedback diac 65 used in the FIGURE 11 circuit arrangement. The load current carrying SCR 11 and feedback diode 23 operate in precisely the same manner as described in connection with the circuit shown in FIGURES 1 and 4 of the drawings. In view of these last two stated facts, the coaction of load current carrying SCR 11 and feedback diode 23, together with the coasting and feedback power diac device 65 is believed to be obvious in the circuit combination of FIGURE 15 and, hence, will not be described again in detail. It should be noted, however, that the load current carrying silicon controlled rectifier device 11 and feedback diode 23 arrangement does not require the use of a small saturable reactor connected in the load current circuit and that for best operation, the isolating capacitors 63 and 63' should be provided to avoid intercoupling between the operation of load current carrying SCR 11 and coasting and feedback diac device 65.

Figure 16:
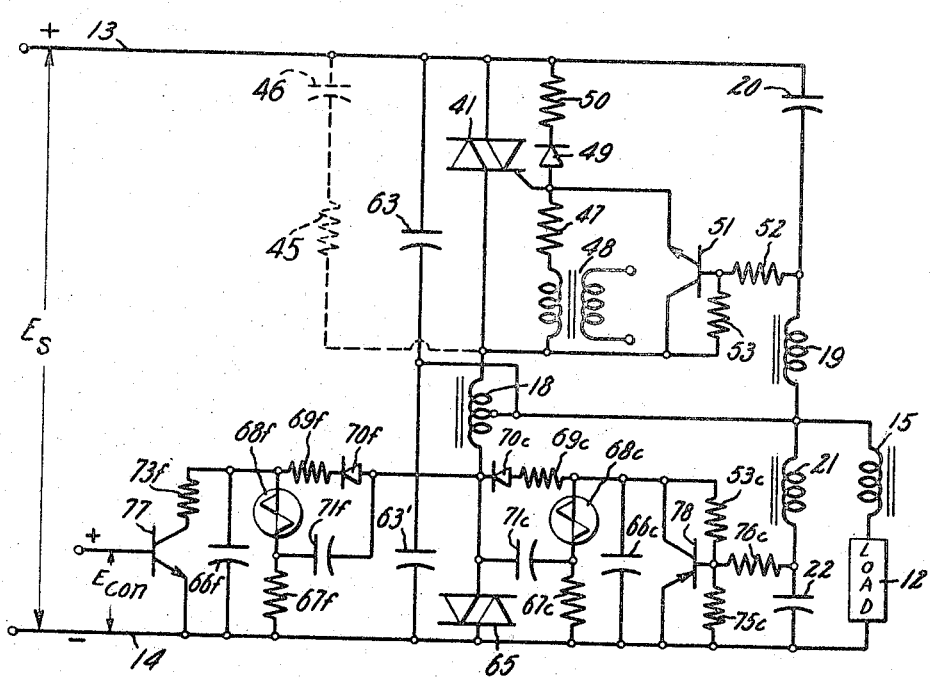
FIGURE 16 is a modification of the time-ratio control power circuit shown in FIGURE 7 with the exception that a bidirectional conducting diac is substituted for one of the triacs of FIGURE 7.

FIGURE 16 of the drawings show still a different form of time-ratio control power circuit constructed in accordance with our invention. The circuit shown in FIGURE 16 is in many respects similar to the circuit shown in FIGURE 7 with the exception that a coasting and feedback power diac bidirectional conducting device 65 is employed in the FIGURE 16 circuit arrangement in place of the coasting and feedback triac 42 used in the FIGURE 7 circuit. In the FIGURE 16 circuit arrangement, the load current carrying bidirectional conducting triac 41 employs the same gating and commutation circuit elements and operates in precisely the same manner as the load current carrying bidirectional conducting triac device 41 described with relation to FIGURE 7. The coasting and feedback power diac bidirectional conducting device 65 of FIGURE 16 employs the same circuit elements in its firing and commutation circuit means and operates in the same manner as the coasting and feedback diac device 65 employed in the circuit of FIGURE 11. In the light of the previous detailed description of the operation of both the load current carrying triac device 41 and the feedback and coasting diac device 65, their cooperation in the circuit configuration of FIGURE 16 is obvious and a further description thereof unnecessary.

Figure 17:
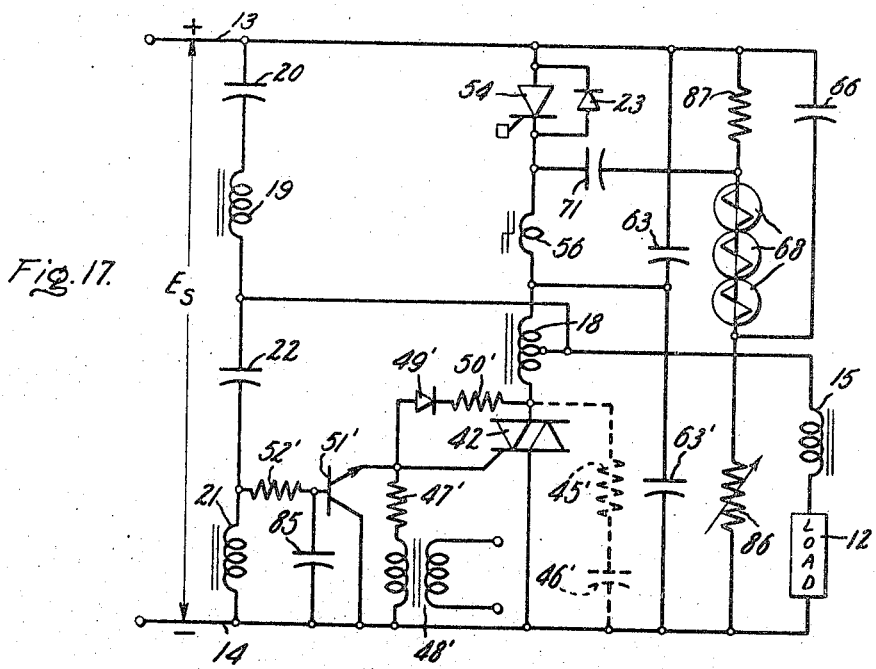
FIGURE 17 is a modification of the time-ratio control power circuit shown in FIGURE 7 with the exception that a $dv/dt$ fired SCR and feedback diode are substituted for one of the triacs of FIGURE 7 and, in addition, illustrates a different form of firing circuit for diacs and $dv/dt$ fired SCR's.

FIGURE 17 of the drawings illustrates still another form of time-ratio control power circuit constructed in accordance with our present invention. The power circuit shown in FIGURE 17 is in many respects similar to the time-ratio control circuit described with relation to FIGURE 7, but differs therefrom in that it employs a $dv/dt$ fired silicon controlled rectifier device 54 having its gate open-circuited, and a feedback diode 23 in the place of the load current carrying triac bidirectional conducting device 41 employed in the circuit arrangement of FIGURE 7. The commutation circuit means comprised by the commutating capacitors 20, 22, linear inductances 19, 21, and tapped linear inductance 18 operates to commutate off the $dv/dt$ fired SCR 54 in precisely the same manner as the commutation circuit scheme first described with respect to FIGURE 1 of the drawings and, hence, will not be described again in detail.

The firing circuit employed to turn on the $dv/dt$ fired SCR 54 is comprised by a pulsing capacitor 66 connected to the juncture of a variable resistor 86 and a plurality of series connected snap action controlled conducting devices 68. The snap action controlled conducting devices 68 may comprise low current rated signal diacs, Shockley diodes, or some similar fast-acting control conducting device connected in series circuit relationship with the variable resistor 86 and a fixed resistor 87 between the power supply terminals 13 and 14. The juncture of the fixed resistor 87 and the snap action control conducting devices 68 is coupled through a coupling capacitor 71 to the negative terminal of the $dv/dt$ fired SCR 54 with the positive terminal of the $dv/dt$ fired SCR 54 being connected to the positive terminal 13. By this arrangement, when the capacitor 66 has built up a sufficient charge determined by the setting of the variable resistor 86, the snap action control conducting devices 68 are rendered fully conducting thereby effectively connecting capacitor 66 and capacitor 71 in series across the $dv/dt$ fired SCR 54. This results in sharply dropping the potential of the negative terminal of the $dv/dt$ fired SCR 54, thereby causing it to be turned full on in the load current carrying direction. The feedback diode 23 operates in the conventional manner of feedback diodes described with relation to FIGURE 1.

The coasting and feedback triac bidirectional conducting device 42 of FIGURE 17 employs precisely the same elements in its gating circuit means comprised by components 47' through 52' and capacitor 85, and its commutation circuit means as does the coasting and feedback triac device 42 in the circuit arrangement of FIGURE 14. Hence, this device operates in precisely the same manner as was described with relation to FIGURE 7 or 14. If desired, a rate of reapplied voltage rise limiting circuit comprised by the dotted resistor 45' and dotted capacitor 46' may be connected across triac 42 to avoid misfiring of this device at the time that the $dv/dt$ fired SCR 54 is turned on. In order to protect the $dv/dt$ fired SCR 54, a small saturable reactor 56 may be connected in series circuit relationship with the device. To assure that transistor 51' continues to conduct and thus clamp the gate of triac 42 throughout the commutation interval, a capacitor 85 may be connected between the base of transistor 51' and terminal 14 as is also illustrated in FIGURE 14. In addition, in order to avoid intercoupling between the load current carrying $dv/dt$ fired SCR 54 and the coasting and feedback triac 42, isolating capacitors 63 and 63' may be provided in the manner similar to the circuits described with relation to FIGURES 14 and 15. Since the operation of the $dv/dt$ fired SCR 54, together with its firing and commutation circuit means, has been described previously in connection with FIGURES 8 and 11 of the drawings, and the construction and operation of the coasting and feedback triac 42, together with its gating circuit means and commutation circuit means, has been described fully in connection with FIGURE 7 of the drawings, their cooperation in the circuit combination shown in FIGURE 17 is believed obvious and further description thereof unnecessary.

Figure 18:
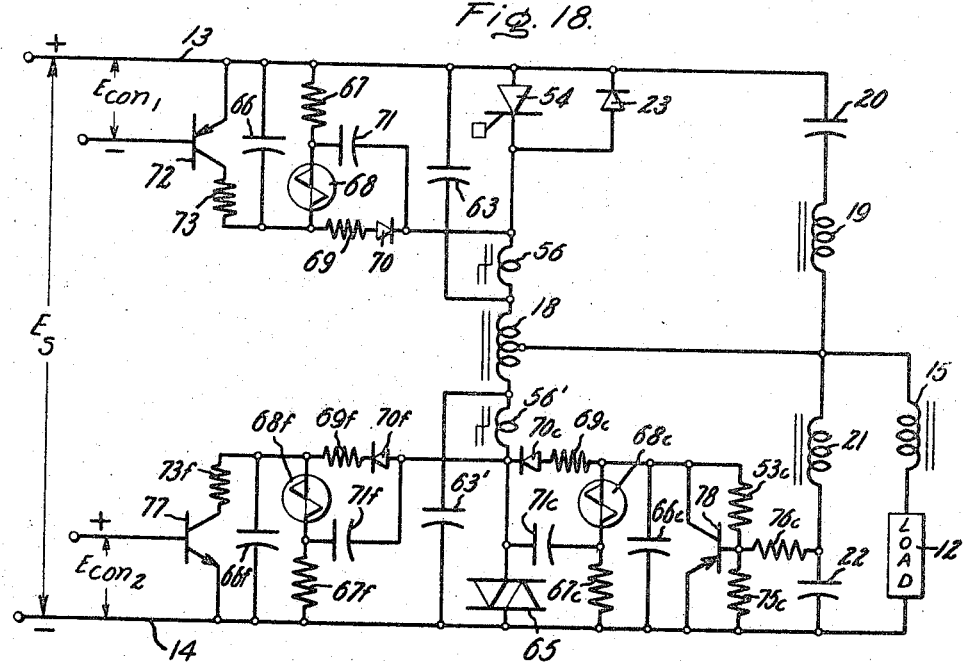
FIGURE 18 is a modification of the time-ratio control power circuit shown in FIGURE 11 with the exception that a $dv/dt$ fired SCR and feedback diode are substituted for one of the diacs of FIGURE 11.

FIGURE 18 of the drawings illustrates still another form of time-ratio control power circuit constructed in accordance with our invention. The circuit shown in FIGURE 18 is almost identical in construction and operation to the time-ratio control circuit shown and described in FIGURE 11. There is an exception, however, in that a $dv/dt$ fired silicon controlled rectifier device 54 having its gate open-circuited and a reverse connected feedback diode 23 is connected in place of the load current carrying power diac bidirectional conducting device 64 of the circuit arrangement shown in FIGURE 11. With this substitution, there is no need for the reverse feedback current firing circuit comprised by elements 66' through 71' and the clamping circuit comprised by elements 53, 74 through 76 used in the circuit arrangement of FIGURE 11. In all other respects, the two circuits are identical and operate in precisely the same fashion and, hence, a further description of the construction and mode of operation of the circuit shown in FIGURE 18 is believed unnecessary.

Figure 19:
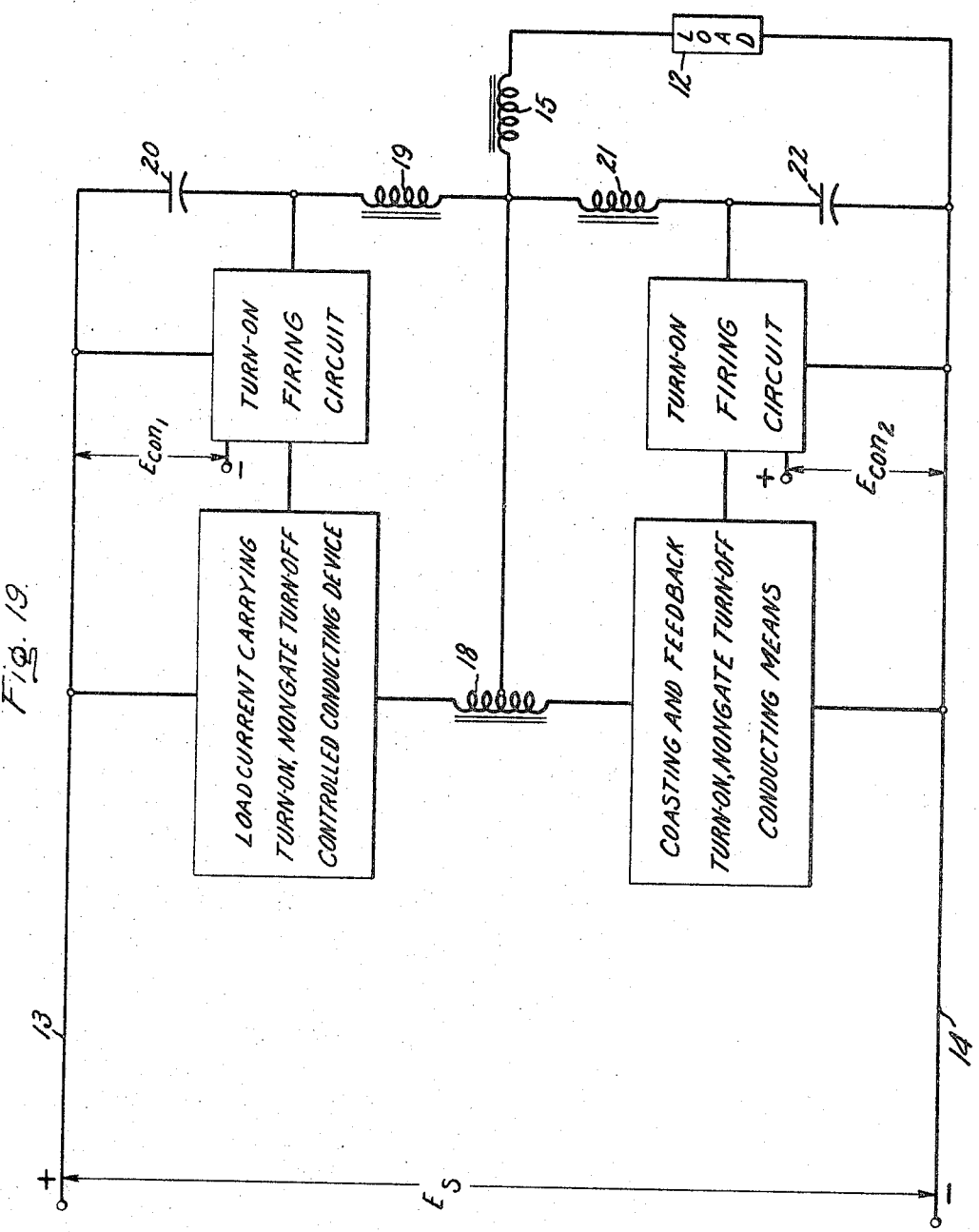
FIGURE 19 is a generalized circuit diagram of the time-ratio control power circuit constructed in accordance with our invention.

FIGURE 19 of the drawings shows a block diagram of a generalized form of time-ratio control power circuit constructed in accordance with our invention. The block designated load current carrying turn-on, nongate turn-off controlled conducting device may comprise a gate turn-on silicon controlled rectifier, a $dv/dt$ turn-on silicon controlled rectifier having its gate open-circuited or a bidirectional conducting device which is a triac or a diac. In like manner, the block designated coasting and feedback turn-on, nongate turn-off conducting means may comprise a gate turn-on SCR or $dv/dt$ fired SCR with gate open-circuited and a coasting diode connected across the SCR in a reverse polarity sense, or a triac or diac. Series resistor-capacitor circuits 45, 46 may be employed in parallel circuit relationship with gate turn-on, nongate turn-off controlled conducting devices for limiting the rate of rise of reapplied voltage of such devices and thereby prevent $dv/dt$ firing thereof. In the case of diacs, $dv/dt$ SCR's, or any combination thereof, isolating capacitors 63, 63' may be connected between the power supply terminals 13, 14 and tapped inductance 18 for preventing interference with the operation of a second such conducting device upon a triggering on of a first such fired device. Also, small saturable reactors 56, 56' may be employed intermediate the conducting devices and tapped winding 18 for shaping a suitably steep high $dv/dt$ pulse to insure triggering on of diacs or $dv/dt$ fired SCR's having their gates open-circuited. Finally, a series circuit comprising a secondary winding 43 inductively coupled to tapped linear inductance 18 and a blocking diode 44 may be connected between the power supply terminals 13 and 14 for feeding back to the power supply the excess energy stored within inductance 18 during the commutation interval. The blocks designated "turn-on firing circuit" contain suitable firing circuits for causing the associated turn-on, nongate turn-off device to conduct current and thereby supply the load with load current, feed back current to the power supply, or effect commutation of the other turn-on, nongate turn-off device. In the case of gate turn-on devices, the firing circuit may be of the type illustrated in FIGURES 4, 5, or 7. In the case of $dv/dt$ fired turn-on devices, the firing circuit may be of the type illustrated in FIGURES 8, 11, 12 or 13. FIGURE 19 thus illustrates that the time-ratio control power circuit constructed in accordance with our invention can be comprised of virtually any combination of individual circuit combinations disclosed in the prior figures herein.

Figure 20:
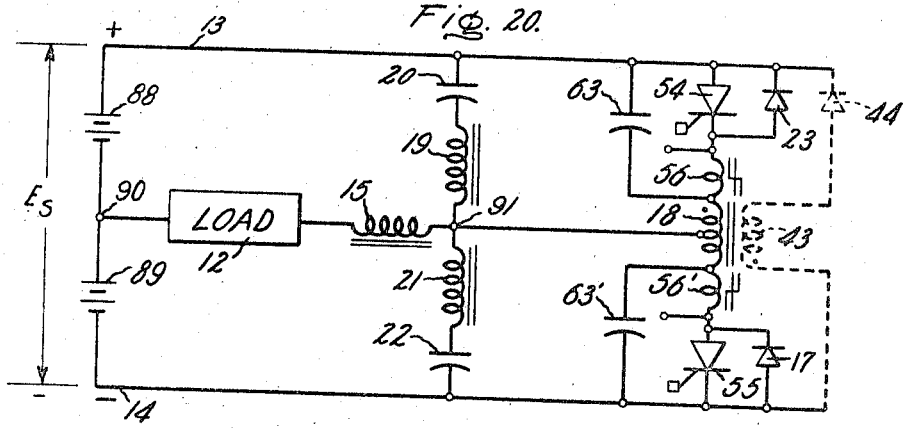
FIGURE 20 is a detailed circuit diagram of a new and improved power circuit employing $dv/dt$ SCR's and our new and improved commutation scheme wherein the power circuit is operable either as a time-ratio control power circuit or single-phase inverter circuit depending upon the particular sequence of firing the $dv/dt$ SCR's.

FIGURE 20 of the drawings illustrates a new and improved circuit constructed in accordance with our invention which is adapted to be operable as either a time-ratio control power circuit or a single phase power inverter circuit, the particular circuit operation obtained being dependent upon the particular sequence of firing of the turn-on, nongate turn-off solid state conducting devices employed in the circuit. In particular, the circuit illustrated in FIGURE 20 may be employed as a time-ratio control power circuit as shown in FIGURE 8 of the drawings and operates in the same manner as described with reference to such figure, or, may operate as a single-phase inverter circuit. The circuit shown in FIGURE 20 is in many respects similar to the time-ratio control power circuit shown in FIGURE 8 in that it employs $dv/dt$ fired silicon controlled rectifier devices 54 and 55 having their gates open-circuited and feedback diode 23 connected across $dv/dt$ SCR 54 and a coasting diode 17 connected across $dv/dt$ fired SCR 55. The commutation circuit employed in the circuit illustrated in FIGURE 20 is identical with the commutation circuit shown in FIGURE 8, and for that matter, identical with the commutation circuit illustrated in each of the embodiments illustrated herein. Thus, a tightly coupled linear inductance 18 is shown in series circuit relationship with $dv/dt$ fired SCR's 54 and 55, a first series circuit comprising linear inductance 19 and commutating capacitor 20 is connected between the positive power supply terminal 13 and the tap point of inductance 18, and a second series circuit comprising linear inductance 21 and commutating capacitor 22 is connected between the tap point of inductance 18 and the negative power supply terminal 14. The two series circuits comprising elements 19 through 22 are each tuned to series resonance at a substantially higher frequency than the power circuit operating frequency as previously described. Filter inductance 15 is connected in the load circuit, and isolating capacitors 63, 63' and small saturable reactors 56 and 56' are employed in the same circuit relationship and operate in the same manner as described with relation to FIGURE 8 and a further description thereof is believed to be unnecessary. The load circuit comprising load 12 and filter inductance 15 is connected between the tap point of inductance 18 and a tap point of a direct current power supply which for purposes of illustration is indicated as series connected batteries 88 and 89 but is understood to comprise any direct current power source having suitable voltage and power rating. A series circuit comprising secondary winding 43 and blocking diode 44 (shown dotted in FIGURE 20) is preferred for use in conjunction with inductive load circuits since it is better able to cope with the reactive component of the load current stored in the load circuit as well as the excess energy built up during the commutating interval as described in relation to FIGURE 6. Since the operation of the circuit shown in FIGURE 20 in the time-ratio control power circuit mode is identical to that described in relation to FIGURE 8, it is believed that further description thereof is unnecessary. It is sufficient to summarize the operation of the circuit shown in FIGURE 20 as a time-ratio control power circuit as follows: Either of the $dv/dt$ fired SCR's 54 or 55 are turned on to supply load current to load 12. Then, after a predetermined time interval, the conducting SCR is commutated off by the other SCR and both SCR's are thence in a blocking condition. This sequence is continued in the manner described with relation to FIGURES 1, 2, and 3 to supply a desired level of direct current power to the load.

The inverter circuit mode of operation in FIGURE 20 employs two load current carrying $dv/dt$ fired SCR's 54 and 55 which are used to alternately connect terminals 13 and 14 of the power supply to one end of a load circuit comprising load 12 and filter inductance 15. Thus, if SCR 54 is turned on by applying an appropriate $dv/dt$ signal thereacross and SCR 55 is in a blocked condition, terminal 91 of the load circuit is in effect connected to terminal 13 of the power supply and the load circuit is across battery 88. Subsequently, SCR 54 is commutated off so that it returns to the blocking condition and SCR 55 is simultaneously turned on. With the circuit operating in this fashion, terminal 91 is now connected to terminal 14, thus reversing the polarity of the potential, now battery 89, supplied across the load circuit. Subsequently, SCR 55 is commutated off and the circuit is thereby returned to its initial quiescent condition ready for another cycle of operation. From this description, it can be appreciated that the timing or sequence of firing of the load current carrying $dv/dt$ SCR's serves to connect the load circuit across the center tap 90 of the power supply and terminal 13 or 14 in an alternate manner so as to develop an alternating current flow through the load circuit during successive periods of operation. Since the terminal end 90 of the load circuit remains at a fixed potential throughout the succesive periods of operation, the peak-to-peak voltage of the alternating current voltage developed across load 12 is equal to the supply voltage $E_s$ which exists across terminals 13 and 14. Also, since the elements in the inverter mode of operation function in the same manner as in the time-ratio control power circuit and have been described previously in connection with FIGURE 8, further description of this feature of the circuit is not believed necessary.

Figure 21:
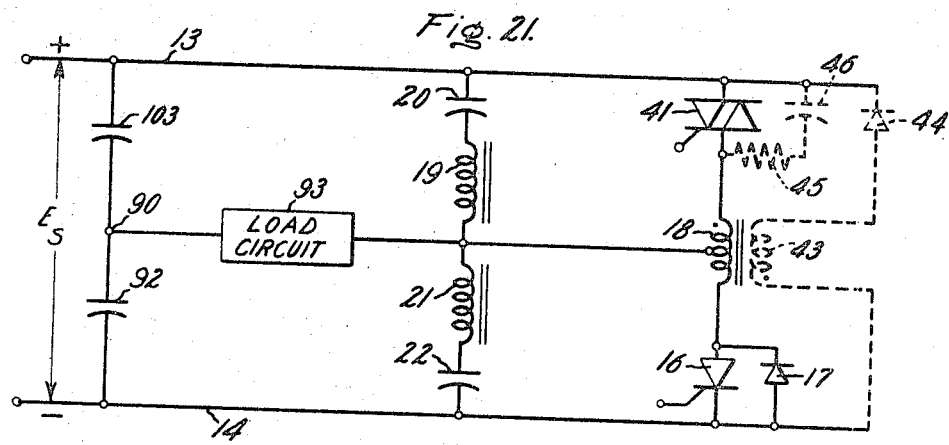
FIGURE 21 is a detailed circuit diagram of a new and improved single-phase inverter circuit employing the new and improved commutation scheme of our invention and using a triac and gate controlled SCR.

FIGURE 21 of the drawings illustrates a form of improved single-phase power inverter circuit constructed in accordance with our invention which is similar to that shown in FIGURE 20 with the exception that a pair of series connected voltage dividing capacitors 103 and 92 are connected across the power supply terminals 13 and 14 and one end of the load circuit is connected to the center tap point 90 of these capacitors. It should be understood that in the inverter circuit illustrated in FIGURE 20, the turn-on, nongate turn-off solid state control conducting devices which are indicated as being $dv/dt$ fired silicon controlled rectifiers having their gates open-circuited may also be any of the other turn-on, nongate turn-off conducting devices previously described such as the gate turn-on, nongate turn-off silicon controlled rectifier, diac or triac. FIGURE 21, however, illustrates the fact that both of the controlled conducting devices need not be of the same type. Therefore, as illustrated, a gate turn-on, nongate turn-off solid state bidirectional triac device 41 is connected between the positive power supply terminal 13 and a first end of tapped linear inductance 18, and a gate turn-on, nongate turnoff silicon controlled rectifier 16 is connected between the second end of inductance 18 and the negative power supply terminal 14. Feedback circuit means comprising secondary winding 43 and diode 44, shown in dotted line form, may be connected across the power supply terminals and functions in the same manner as illustrated in FIGURE 6. A rate of rise of voltage limiting circuit comprising resistor 45 and capacitor 46, show in dotted line form, may be connected across triac 41 in the same manner as illustrated in FIGURE 6 and operates in the same manner. For purposes of simplification, load 12 and filter inductance 15 are indicated in FIGURE 21 and hereinafter as load circuit 93. Since one end of load circuit 93 is connected to the tap point 90 of the voltage dividing capacitors 103 and 92, it is obvious that only alternating current may pass through the load circuit 93 and thus the circuit of FIGURE 21 is operable only as a single-phase power inverter circuit as distinguished from the two modes of operation of the circuit illustrated in FIGURE 20. The load circuit connection at point 90 also limits the peak-to-peak voltage developed across the load circuit to the supply voltage $E_s$ as in the case of the FIGURE 20 circuit.

Figure 22:
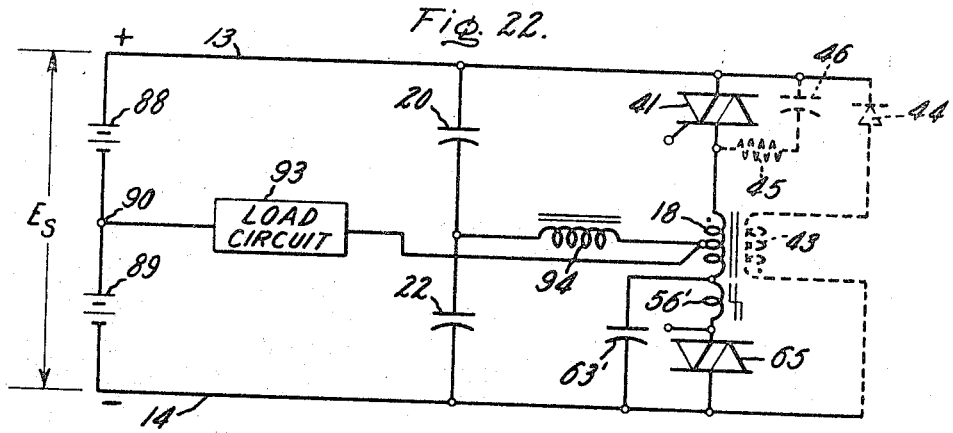
FIGURE 22 is a modification of the power circuit shown in FIGURE 20 with the exception that a triac is substituted for the first $dv/dt$ SCR-feedback diode combination, a diac is substituted for the second $dv/dt$ SCR-coasting diode combination, and our new and improved commutation circuit is rearranged.

FIGURE 22 of the drawings shows a different form of the power circuit illustrated in FIGURE 20, the major difference being that a common linear inductance 94 is used in place of the two linear inductances 19 and 21 of the circuit shown in FIGURE 20. The common linear inductance 94 is connected between the juncture of commutating capacitors 20 and 22 and the tap point of linear inductance 18. The load circuit 93 is connected between the center tap point 90 of the direct current source represented as two direct current sources 88 and 89 and the tap point of inductance 18 such that the commutating current produced by the discharge of capacitors 20 and 22 passes through inductance 94 before passing to the load circuit 93 in the same manner as in FIGURE 20. The commutating frequency in the circuit of FIGURE 22 can be made the same as that obtained in FIGURE 20 by employing commutating capacitors having the same capacitance and common inductance 94 having one-half the inductance of each of inductances 19 and 21 shown in FIGURE 20. The pair of turn-on, nongate turn-off controlled conducting devices in FIGURE 22 are the same as those used in FIGURE 16, that is, a triac 41 and diac 65. In light of the previous detailed description of the operation of the inverter mode of operation in FIGURE 20 and the previous description of the operation of both the triac and diac, their cooperation in the circuit configuration of FIGURE 22 is believed to be obvious, and a further description thereof is not necessary. It should be obvious that capacitors 103 and 92 can be substituted for batteries 88 and 89 in the manner shown in FIGURE 21 and thereby obtain a pure inverter circuit in FIGURE 22.

Figure 23:
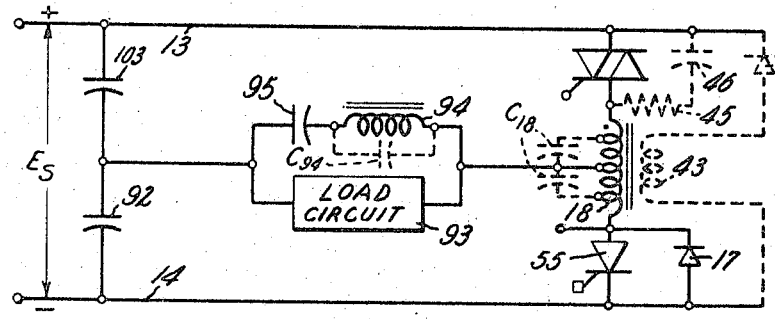
FIGURE 23 is a modification of the inverter circuit shown in FIGURE 21 with the exception that a $dv/dt$ SCR is substituted for the conventional gate controlled SCR of FIGURE 21 and our commutation circuit is further rearranged.

FIGURE 23 of the drawings shows a still different form of single-phase power inverter circuit constructed in accordance with our invention. The circuit shown in FIGURE 23 is in many respects similar to the circuit shown in FIGURE 21 with the chief distinction being that a common commutating capacitor 95 and common linear inductance 94 are employed in place of the two commutating capacitors 20 and 22 and the two linear inductances 19 and 21 of the circuit shown in FIGURE 21. In the circuit shown in FIGURE 23, the common commutating capacitor 95 and common linear inductance 94 are connected in series circuit relationship with each other and this series circuit connected in parallel circuit relationship with the load circuit 93. The series circuit comprising commutating capacitor 95 and linear inductance 94 is tuned to resonate at the commutating frequency which is, as in all of the embodiments herein described, substantially higher than the operating frequency of the inverter circuit. The same commutating frequency may be obtained in the circuit of FIGURE 23 as in the circuit of FIGURE 21 by having capacitor 95 have twice the capacitance of capacitor 20 or 22 and inductance 94 have one-half the inductance of inductances 19 or 21. Isolation of the firing circuit for $dv/dt$ fired silicon controlled rectifier 55 is obtained by designing tapped linear inductance 18 such that the distributed capacitance between the tap point and points adjacent the respective ends thereof is relatively great in the manner described for the circuit of FIGURE 10. As in FIGURE 10, inductance 94 is selected to have sufficient distributed capacitance $C_{94}$. It should be obvious that batteries 88 and 89 can be substituted for capacitors 103 and 92 in the manner shown in FIGURE 20 and obtain a circuit operable in a first mode as a time-ratio control power circuit and in a second mode as an inverter circuit, the particular mode being determined by the sequence of firing of the conducting devices 41 and 55.

Figure 24:
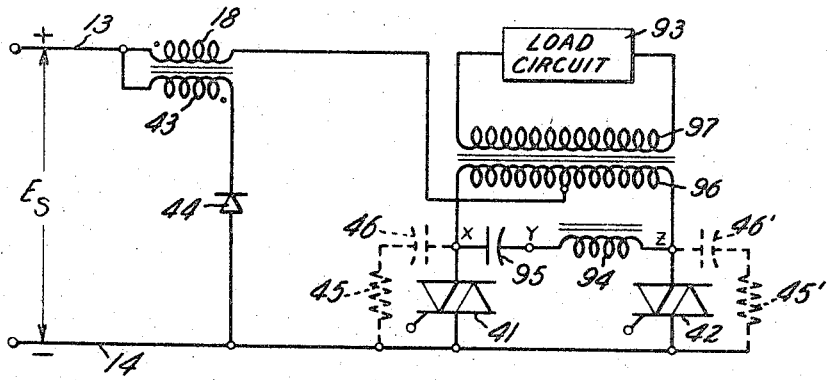
FIGURE 24 is a detailed circuit diagram of a second form of the new and improved single-phase inverter circuit constructed in accordance with our invention.

The embodiment of our invention shown in FIGURE 24 of the drawings is somewhat different from the single-phase inverter circuit shown in FIGURES 20–23 in that a nongate electrode of both triac devices 41 and 42 is coupled to the negative terminal 14 of the direct current power supply and the other nongate electrode of both triacs is connected to the ends of respective winding halves of a center tapped winding 96. The center tap point of winding 96 is connected through the commutating interval current limiting reactor 18 (which in this particular embodiment is not center tapped) to the positive terminal 13 of the direct current power supply. The commutating interval current limiting winding 18 is inductively coupled to a secondary winding 43 connected in series with a blocking diode 44 across the direct current power supply $E_s$ to provide feedback to the power line of the energy stored in inductance 18 during the commutating interval in the same manner as previously disclosed. Commutating capacitor 95 is connected in series circuit relationship with linear inductance 94 between the junctures of the ends of winding 96 and electrodes of triacs 41 and 42. As in the previous cases, the series circuit comprising capacitor 95 and inductance 94 is tuned to series resonance at a commutating frequency which is substantially higher than the operating frequency of the inverter. Load current is supplied to the load circuit 93 of the inverter circuit through a secondary winding 97 which is inductively coupled to the center tapped winding 96.

The single-phase inverter circuit of FIGURE 24 functions in the following manner: Assuming the triac 41 is conducting and triac 42 is turned off, the commutating capacitor 95 will be charged such that the point X is at the potential $-E_s$ of the negative terminal 14 of the direct current power supply, and point Y is charged to double the positive potential $+E_s$. Upon triac 42 being turned on, point Z will be connected to the same potential as point X, and both points will, in effect, be at the same potential $-E_s$ as the negative terminal 14 of the direct current power supply. The charge trapped in the commutating capacitor 95 on this occurrence will flow through triac 42 and triac 41, thereby reducing the load current through triac 41 to zero and thus turning it off. On the alternate cycle, the reverse process takes place to commutate off the triac 42. During commutation, the additional current $\Delta I$ built up during the commutating interval will flow into the center tap point on winding 96, split, and supply equal currents in opposite directions through the winding halves. As a consequence, the ampere turn effects of these currents will cancel each other and winding 96 will not appear as an impedance to this additional current. In order to prevent this additional current ΔI from increasing at too great a rate, the commutating interval current limiting reactor winding 18 is included in the circuit and functions in the same manner as previously disclosed with relation to FIGURE 1. Thus, a further description of the circuit and its operation is believed to be unnecessary.

The circuits illustrated in FIGURES 1–23 all could have included a pair of turn-on, nongate turn-off controlled conducting devices which were not of the same type as has been illustrated by way of example in FIGURES 10, 14, 15, 16, 17, 18, 19, 21, 22, and 23. In the FIGURE 24 circuit embodiment, however, the two controlled conducting devices are preferably of the same type, although this is not a requirement for successful operation of the circuit.

Figure 25:
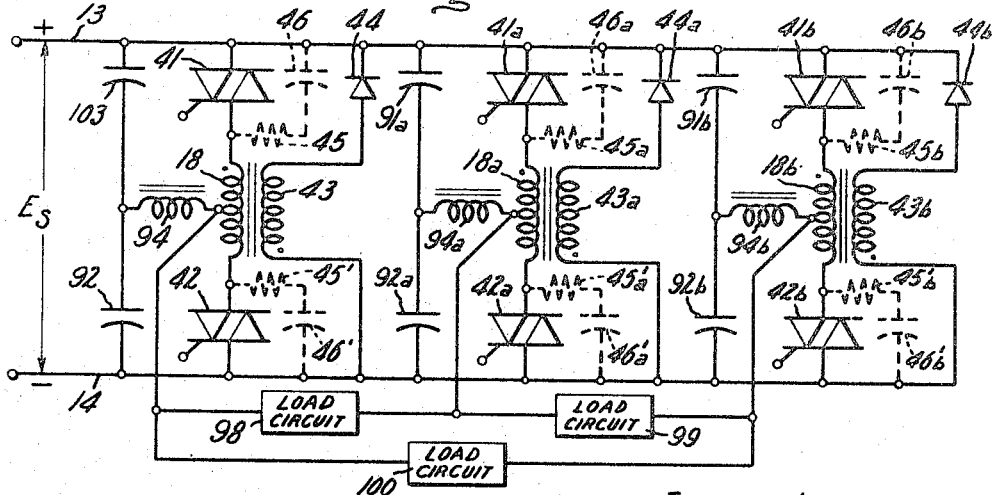
FIGURE 25 is a detailed circuit diagram of a three-phase inverter employing as its basic building block a circuit similar to the single-phase inverter of FIGURE 22.

A three-phase inverter circuit constructed in accordance with our invention is shown in FIGURE 25 of the drawings. The three-phase inverter of FIGURE 25 is actually constructed from three single-phase inverters of the type shown in FIGURE 22 of the drawings with the exception that voltage dividing capacitors are shown in place of direct current sources, and a pair of similar turn-on, nongate turn-off controlled conducting devices are employed in each of the three phases in place of the two different type devices illustrated in FIGURE 22. Hence, all of the elements in the circuit of FIGURE 25 have been identified with the same reference numerals which the corresponding elements have in FIGURE 22 with the letter *a* being added in the second single-phase inverter circuit and the letter *b* being added in the third phase inverter circuit. Because each of the three single-phase inverters employed in the FIGURE 25 circuit is constructed and operate in essentially an identical manner to that described in relation to FIGURE 22, they will not be described again in detail. The outputs of the three single-phase inverters are combined in a delta connected load circuit comprised by one load 98 being connected between the center tap points of inductances 18 and 18a, a load 99 connected between center tap points of inductances 18a and 18b, and a load 100 connected between center tap points of inductances 18 and 18b. It would also be possible to combine the outputs in a Y connected load circuit with or without a neutral connected to ground, or with a neutral connected back to the neutral of the direct current power supply. By interconnecting the individual loads of the single-phase inverters in any of the above manners, the outputs of the inverters can be combined to provide a three-phase output. It is, of course, necessary that the timing of the gating-on and turn-off signals applied to the gating electrodes of the several triacs be properly synchronized by the gating signal sources. For this reason, the gating signal source must be especially designed for three-phase operation in the manner of those illustrated and described on pages 130 and 133 of the above-described SCR manual.

Figure 26:
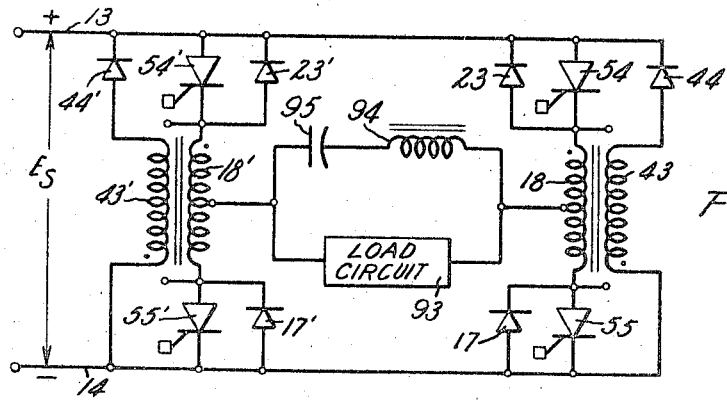
FIGURE 26 is a detailed circuit diagram of a single-phase, full-wave bridge inverter circuit employing as its basic building block a circuit similar to the single-phase inverter of FIGURE 23.

FIGURE 26 of the drawings illustrates a single-phase, full-wave bridge inverter circuit which employs two of the basic single-phase inverter circuit arrangements of FIGURE 23 modified to provide full-wave bridge operation. Full-wave bridge operation results in an alternating voltage developed across the load having a peak-to-peak amplitude equal to twice the power supply voltage $E_s$. To form the full-wave bridge inverter circuit of FIGURE 26, the voltage dividing capacitors 103 and 92 of the single phase inverter of FIGURE 23 have been replaced with a second set of series connected $dv/dt$ fired silicon controlled rectifiers 54' and 55' and center tapped inductance 18' shown on the left-hand portion of the circuit as viewed by the reader. It is to be noted that FIGURE 26 is an all $dv/dt$ fired SCR circuit as distinguished from the triac-$dv/dt$ SCR circuit of FIGURE 23.

In operation, the full-wave bridge inverter of FIGURE 26 functions in essentially the same manner as two of the previously described single-phase inverters shown in FIGURE 23 but must employ an appropriate turn-on signal source for simultaneously providing turn-on signals across two $dv/dt$ fired SCR's to achieve full-wave bridge operation. Because of the fact that the inverter circuit of FIGURE 26 employs a common commutating capacitor 95, it is necessary that the $dv/dt$ fired SCR's be turned on and off in a closely controlled manner to avoid complications in the operation of the circuit.

Figure 27:
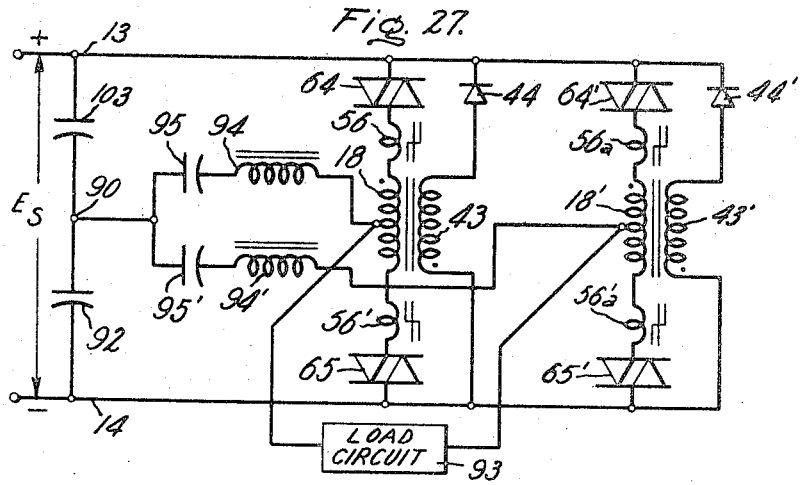
FIGURE 27 is a detailed circuit diagram of a modified version of the full-wave bridge inverter circuit of FIGURE 26.

In order to obviate the need for rigorous synchronization of the firing of the turn-on, nongate turn-off controlled conducting devices in the circuit shown in FIGURE 26 of the drawings, the full-wave bridge inverter circuit of FIGURE 27 has been provided. The single-phase full-wave bridge inverter of FIGURE 27 is similar to the inverter of FIGURE 26 with the exception that two series circuits comprising commutating capacitor 95 and linear inductance 94 in the first and commutating capacitor 95' and linear inductance 94' in the second have been provided in place of the single series circuit used in the embodiment shown in FIGURE 26. In the full-wave bridge inverter circuit of FIGURE 27, a pair of series connected voltage dividing capacitors 103 and 92 are connected across the direct current power supply with the center tap point 90 of the voltage dividing capacitors connected through the series circuit comprised by commutating capacitor 95 and linear inductance 94 to the center tap of inductance 18. Similarly, the center tap point of the voltage dividing capacitors is connected through the second series circuit comprised by commutating capacitor 95' and linear inductance 94' to the center tap of inductance 18'. The load circuit 93 to be supplied is connected between the center tap points of the two inductances 18 and 18'. To again illustrate the fact that any of the turn-on, nongate turn-off controlled conducting devices disclosed herein may be employed in the inverter circuit illustrated in FIGURE 27, diac devices 64, 65, 64', and 65' are used in place of the $dv/dt$ fired SCR's 54, 55, 54', and 55', respectively, shown in FIGURE 26.

Figure 28:
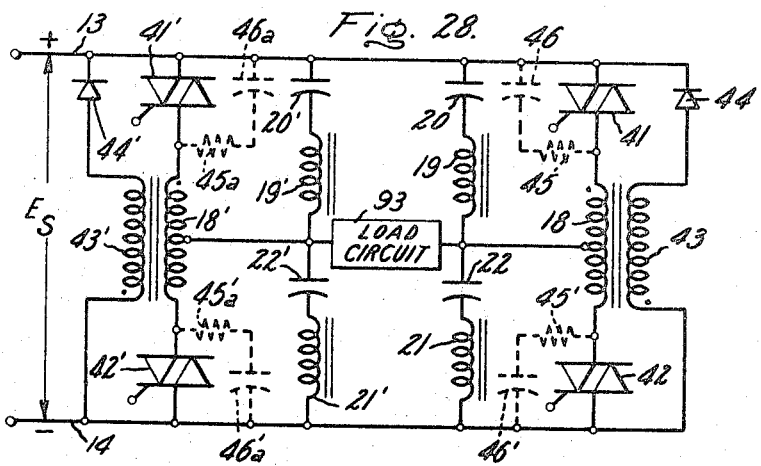
FIGURE 28 is a detailed circuit diagram of still a third form of single-phase, full-wave bridge inverter circuit employing as its basic building block a circuit similar to the single-phase inverter of FIGURE 21.

In operation, the full-wave bridge inverter circuit of FIGURE 27 functions in essentially identical fashion to two single-phase inverter circuits of the type shown in FIGURE 23 of the drawings and operated in a bridge inverter circuit manner to provide an alternating current flow through the load circuit 93. Because separate commutating circuits are provided for each of the center tapped inductances 18 and 18', it is no longer essential to so closely synchronize the turning on or turning off of the various turn-on, nongate turn-off control conducting devices as was the case with the full-wave bridge inverter circuit shown in FIGURE 26 of the drawings. It should be noted, however, that the single phase, full-wave bridge inverter circuit shown in FIGURE 27 require a center tapped direct current power supply which increases the cost of the inverter somewhat. To obviate this need, a circuit such as that shown in FIGURE 28 of the drawings is provided. The full-wave bridge inverter circuit shown in FIGURE 28 of the drawings is comprised by two single-phase inverter circuits of the type shown in FIGURE 21 interconnected through a common load circuit 93. Because the full-wave bridge inverter circuit of FIGURE 28 is essentially no different in construction (with the exception that a second triac device is employed in place of the gate fired SCR 16 and coasting diode 17) and operation from the two single-phase inverter circuits of the type illustrated and described with relation to FIGURE 21, the various parts of the circuits have been identified by the same reference numerals and a further description of the construction and operation of the circuit is believed unnecessary. It should be noted, however, that the full-wave bridge inverter circuit of FIGURE 28 does not require a center tapped direct current power supply even though it does require two additional inductances and commutating capacitors.

Figure 29:
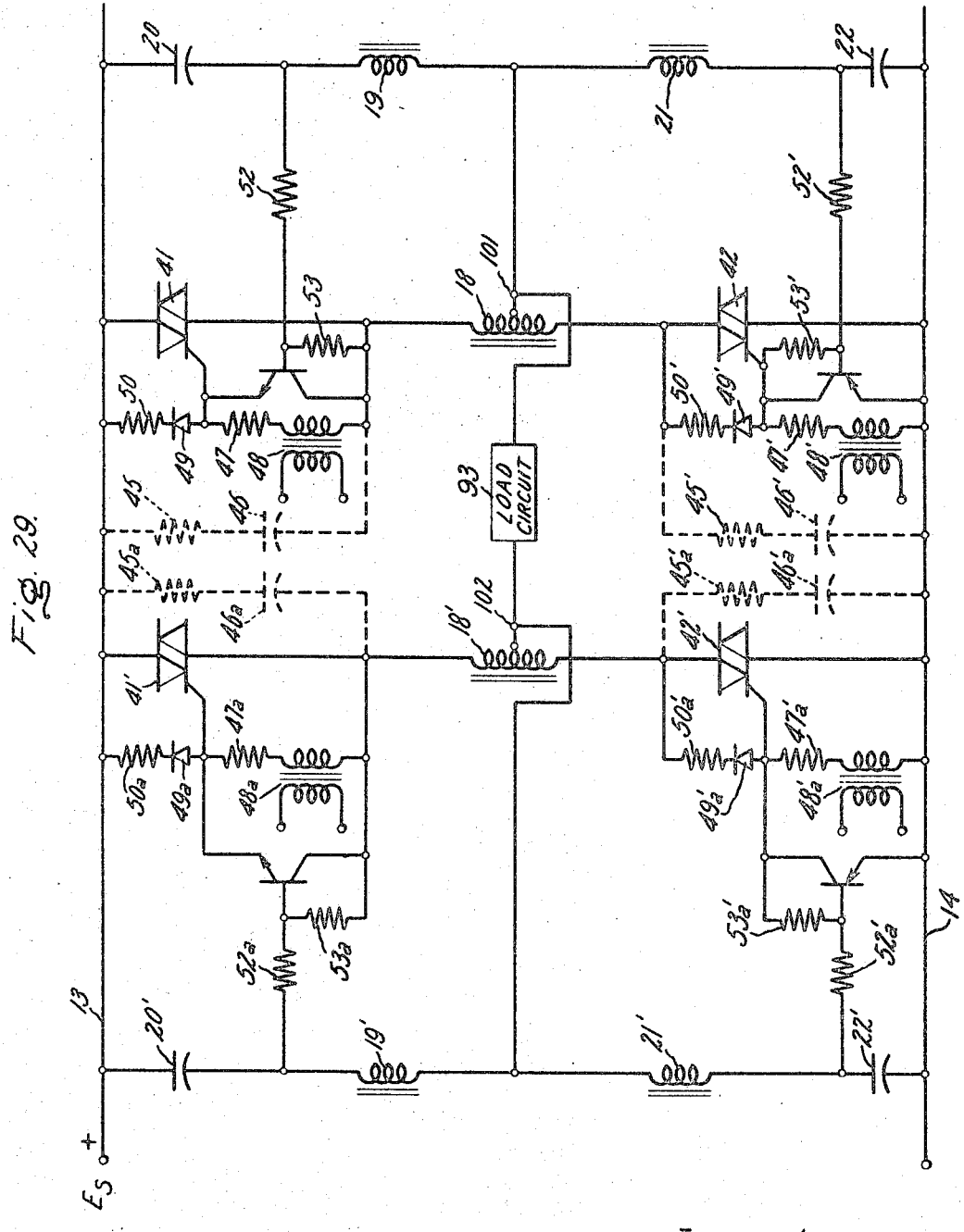
FIGURE 29 is a detailed circuit diagram of a new and improved single-phase, full-wave bridge inverter circuit employing as its basic building block the circuit shown in FIGURE 7.

FIGURE 29 of the drawings is a more detailed form of the improved power inverter circuit illustrated in FIGURE 28, and in particular, illustrates the firing circuit means (gate firing circuits for the particular case of the gate turn-on triac devices) which are identical in construction and operation to the gating circuit and commutation circuit means described in connection with the triac devices of FIGURE 7 of the drawings. The gating circuit means associated with each of the load current carrying triac devices 41′ and 42′ are mirror versions of the gating circuit means associated with triac devices 41 and 42 of FIGURE 7 and they operate in the same manner. In operation, the gating circuits of triacs 41 and 42′ are phased so that these devices turn on simultaneously and conduct at the same time. Thus, triacs 41 and 42′ serve to operatively connect the terminal 101 of load circuit 93 to terminal 13, and terminal 102 of load circuit 93 to terminal 14, respectively. Subsequently, triacs 41 and 42′ are commutated off concurrently and the two triacs 41′ and 42 are gated on simultaneously and conduct for the same time period. Upon this occurrence, the terminal 102 will be connected to terminal 13 by triac 41′ and terminal 101 of the load circuit will be connected to terminal 14 by triac 42 thereby reversing the polarity of the potential applied across the load circuit 93. Subsequently, the two load current carrying triacs 41′ and 42 are commutated off thereby returning the inverter circuit to its initial condition ready for a new cycle of operation. Repeated operation of the circuit in this manner then functions to develop an alternating current through the load circuit 93.

Figure 30:
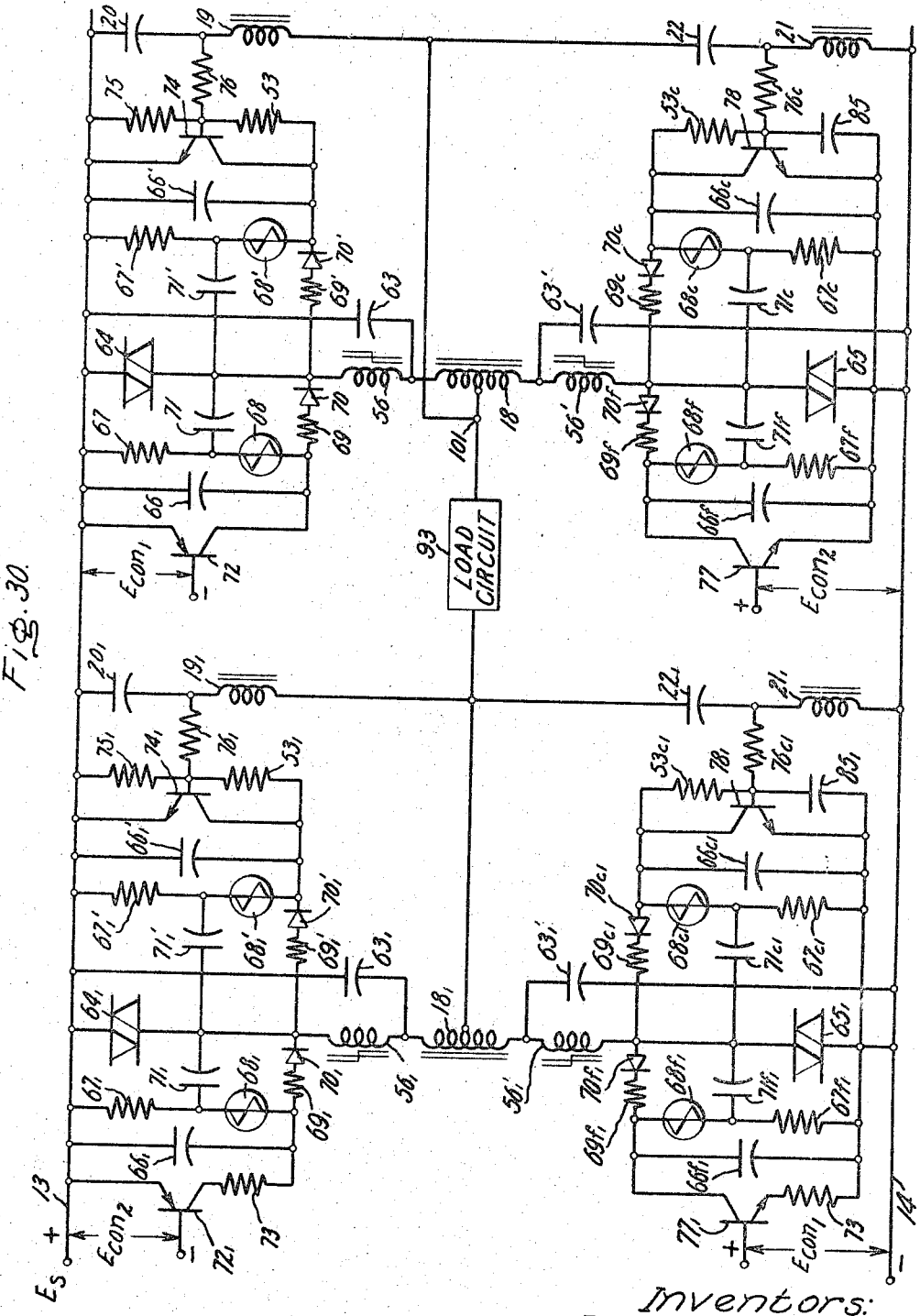
FIGURE 30 is a detailed circuit diagram of a new and improved single phase, full-wave bridge inverter circuit employing as its basic building block the circuit shown in FIGURE 11.

FIGURE 30 of the drawings shows still another detailed full-wave bridge inverter circuit constructed in accordance with our invention. The circuit shown in FIGURE 30 is in many respects similar to the circuit shown in FIGURE 28 with the exception that power diac devices 64, 65, 64′, and 65′ are employed in place of FIGURE 28 triac devices 41, 42, 41′, and 42′, respectively. In addition, the turn-on firing circuits are identical in construction and operation to the turn-on firing circuits described with relation to FIGURE 11. Because each of the elements of the gating and commutating circuit means associated with the power diacs are the same, and perform the same function as the correspondingly numbered elements of the FIGURE 11 circuit, these elements in FIGURE 30 have been given the reference designations employed in FIGURE 11 with the addition of subscript 1 to the elements at the left side of the circuit as seen by the reader.

Since the gating and commutation circuit means illustrated in FIGURE 30 function precisely the same as the correspondingly numbered elements described with respect to the circuit of FIGURE 11, a further description of the construction and operation of these elements is believed unnecessary.

In operation, the inverter circuit of FIGURE 30 operates in the same manner as the circuit shown in FIGURES 25–29 in that the load current carrying power diacs 64, 65, 64′, and 65′ operate to connect terminals 101 and 102 of the load circuit 93 alternately across the power supply terminals 13 and 14 to thereby alternately reverse load current flow through the load circuit. This is achieved by firing the load current carrying diacs 64 and 65′ simultaneously, commutating these diacs off, then firing simultaneously the two load current carrying diacs 64′ and 65, and then commutating these diacs off to thereby complete the cycle of oscillation. By reason of the use of diac load current devices 64, 65, 64′, and 65′, the frequency of operation of the circuit shown in FIGURE 30 can be much higher than the inverter circuits shown in FIGURES 25, 26, 28 and 29.

Figure 31:
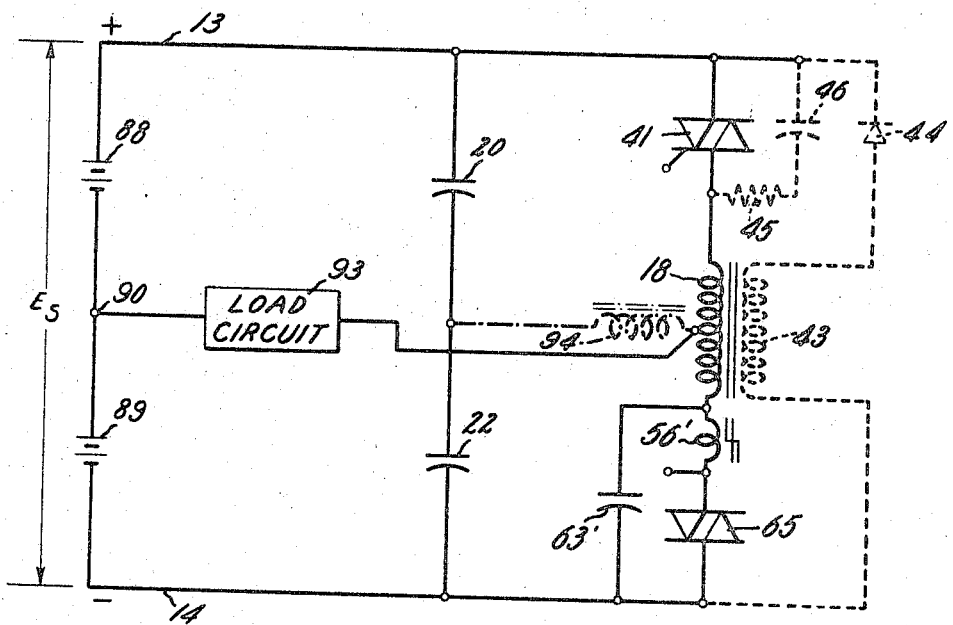
FIGURE 31 is a modification of the power circuit shown in FIGURE 22.

FIGURE 31 of the drawings illustrates a more simplified form of the power circuit shown in FIGURE 22 wherein the linear inductance 94 of FIGURE 22 has been eliminated. This simplification is attained by winding tapped winding 18 in a loose manner to obtain low coupling between the two halves of the winding as distinguished from the tight coupling of winding 18 in the previously described embodiments. Alternatively, winding 18 may comprise two separate windings. The low coupling between the two halves of winding 18 provides a large leakage reactance which is the equivalent of an inductance 94 connected between the juncture of capacitors 20, 22 and the tap point of inductance 18. This equivalent inductance 94 is shown in FIGURE 31 in dot-dash form. In all respects, the circuit and its operation are identical to that of FIGURE 22.

From the foregoing description, it can be appreciated that our invention provides an entire family of new and improved power circuits employing turn-on, nongate turn-off controlled conducting devices. These new and improved power circuits employ an improved commutation scheme which allows for a reduction in the size of the components employed in the circuits for a given power rating and, hence, can be manufactured economically. Further, it can be appreciated that our invention makes available a whole new family of power circuits which are economical and efficient in operation. These power circuits employing the improved commutation scheme assure commutation which is independent of load from a no load to full load condition of operation. By reason of our improved commutation circuitry, a reduction in the number of components employed in the circuits is possible since the additional or auxiliary turn-on conducting devices often employed in commutation circuits are completely absent, thus, making the manufacture of the circuits less expensive than would be with previous commutation circuits. Further, many difficulties encountered in the manufacture, design, and operation of previously known power circuits are minimized. It should also be noted that alternating current excitation of the circuits herein disclosed is possible wherein the circuits, where operated as time ratio control power circuits, are employed to chop out any desired portion of either half cycle of an applied alternating current supply voltage as mentioned previously in column 5, lines 48–50, of the specification. With the circuits operated in the inverter mode and using alternating current for excitation, the circuits can be employed as economical and reliable frequency changers.

Having described several embodiments of our new and improved power circuits in the form of time-ratio control power circuits and inverter circuits, it is believed obvious that other modifications and variations of our invention are possible in the light of the above teachings. For example, any of the described turn-on, nongate turn-off controlled conducting devices herein described may be employed in any of the circuits illustrated herein by employing suitable turn-on firing circuits for the particular type of controlled conducting device. In particular, the triacs and gate turn-on silicon controlled rectifiers may be interchanged since they can employ similar gate turn-on firing circuits, and power diacs and $dv/dt$ fired silicon controlled rectifiers with gates open-circuited may be interchanged since they employ similar $dv/dt$ turn-on firing circuits. Further, the particular arrangement of the commutating circuit elements 119 through 22, 94, and 95 in the inverter circuits shown in FIGURES 20, 22, 23, and 31 may also be employed in the time-ratio control power circuits illustrated in FIGURES 1 through 19. It is, therefore, to be understood that changes may be made in the particular embodiments of our invention described which are within the full intended scope of the invention as defined by the appended claims.

What we claim as new and desire to secure by Letters Patent of the United States is:

1. An improved power circuit including in combination a pair of turn-on, nongate turn-off, solid state controlled conducting devices, a tapped first linear inductor interconnected with said pair of devices in series circuit relationship across a pair of power supply terminals which are adapted to be connected across a source of electric potential, a load circuit operatively connected in series circuit relationship with a first of said pair of devices, said load circuit being connected through a direct current path between the tap point of said first linear inductor and one of said power supply terminals, and commutation circuit means comprising at least one commutating capacitor and series connected second linear inductor operatively connected to the tap point of said tapped first inductor, the series circuit comprised by the commutating capacitor and second inductor being further connected to the terminal of one of said pair of conducting devices not connected to said tapped first inductor, the series circuit comprised by the commutating capacitor and second inductor being tuned to series resonance at a commutating frequency having a period which is substantially shorter than the load current conducting periods of the power circuit, one of said pair of conducting devices being adapted to be intermittently conductive for discharging the commutating capacitor through the tapped first inductor and thereby terminating the conduction of the other of said pair of conducting devices.

2. An improved power circuit including in combination a pair of turn-on, nongate turn-off, solid state controlled conducting devices, a tapped first linear inductor interconnected with said pair of devices in series circuit relationship across a pair of power supply terminals which are adapted to be connected across a source of electric potential, a load circuit operatively connected through a direct current path in series circuit relationship with a first of said pair of devices, said load circuit being connected between the tap point of said first linear inductor and the terminal of the second of said pair of devices not connected to the tapped first linear inductor, and commutation circuit means comprising said tapped first inductor and a pair of second linear inductors and commutating capacitors, a first inductor and capacitor of said pair of second linear inductors and commutating capacitors connected in series circuit relationship between the tap point of said tapped first inductor and a terminal of the first of said pair of devices, the second inductor and capacitor of said pair of second linear inductors and commutating capacitors connected in series circuit relationship between the tap point of said tapped first inductor and a terminal of the second of said pair of devices, each series connection of said pair of second linear inductors and commutating capacitors tuned to series resonance at a substantially higher frequency than the power circuit operating frequency, the second of said pair of devices adapted to be intermittently conductive for discharging the commutating capacitors through the tapped first inductor and thereby commutating off the first of said pair of devices.

3. The combination set forth in claim 2 further including a series circuit comprising a fourth inductor magnetically coupled to said tapped first linear inductor, and a diode, said latter series circuit connected across said power supply terminals and adapted to limit the voltage at the tap point of said tapped first inductor during the commutating interval and feed back excessive commutating energy to the source of electric potential.

4. The combination set forth in claim 2 further including a series circuit comprising a resistance and a third capacitor connected across one of said pair of controlled conducting devices for limiting the rate of rise of voltage across said latter device.

5. An improved power circuit including in combination a pair of gate turn-on, nongate turn-off solid state silicon controlled rectifier devices, a tapped first linear inductor interconnected with said pair of devices in series circuit relationship across a pair of power supply terminals which are adapted to be connected across a source of electric potential, a load circuit including a series connected filter inductor, said load circuit and filter inductor being operatively connected through a direct current path in series circuit relationship with a first of said pair of devices, said load circuit connected between the tap point of said first linear inductor and the terminal of the second of said pair of devices not connected to the tapped first linear inductor, a diode connected across the second of said pair of devices in a parallel reverse polarity sense, and commutation circuit means comprising said tapped first inductor, a second linear inductor and first commutating capacitor connected in series circuit relationship between the tap point of said first inductor and a terminal of the first of said pair of devices, a third linear inductor and second commutating capacitor connected in series circuit relationship between the tap point of said first inductor and a terminal of the second of said pair of devices, each of said series connected inductors and capacitors being tuned to series resonance at a substantially higher frequency than the power circuit operating frequency, the second of said pair of devices adapted to be intermittently conductive for discharging the commutating capacitors through the tapped first inductor and thereby terminating the conduction of the first of said pair of devices.

6. An improved power circuit including in combination a first gate turn-on, nongate turn-off solid state silicon controlled rectifier device connected in series circuit relationship with a first portion of a tapped first linear inductor, a filter inductor, and a load circuit, said series circuit connected across a pair of power supply terminals which are adapted to be connected across a direct current power supply, the positive and negative terminals of said first controlled rectifier device connected to the positive power supply terminal and to a first end of said tapped first inductor, respectively, a second gate turn-on, nongate turn-off solid state silico controlled rectifier device connected in series circuit relationship with a second portion of said tapped first linear inductor, the positive and negative terminals of said second controlled rectifier device being connected to a second end of said tapped first inductor and to the negative power supply terminal, respectively, commutation circuit means comprising said tapped first linear inductor, a second linear inductor and first commutating capacitor connected in series circuit relationship between the tap point of said first inductor and the positive power supply terminal, a third linear inductor and second commutating capacitor connected in series circuit relationship between the tap point of said first inductor and the negative power supply terminal, each of said series connected inductors and capacitors tuned to series resonance at a substantially higher frequency than the power circuit operating frequency, selected ones of said first and second controlled rectifier devices adapted to be selectively operative in a load current carrying state and a commutating state, respectively, said selected second controlled rectifier device when operable in the commutating state discharging the commutating capacitors through their respective serially connected inductances and the tapped first linear inductor thereby terminating the conduction of said selected first controlled rectifier device operable in the load current carrying state, a feedback diode connected across said first controlled rectifier device in a reverse polarity sense and being operative when said first controlled rectifier device is in a nonload current carrying state, and a coasting diode connected across said second controlled rectifier device in a reverse polarity sense and being operative when said second controlled rectifier device is not operative in a commutating state.

7. An improved power circuit including in combination a pair of turn-on, nongate turn-off solid state bidirectional conducting devices, a tapped first linear inductor interconnected with said pair of bidirectional conducting devices in series circuit relationship across a pair of power supply terminals which are adapted to be connected across a source of electric potential, a load circuit including a series connected filter inductor, said load circuit operatively connected in series circuit relationship with a first of said pair of bidirectional conducting devices, said load circuit connected between the tap point of said first linear inductor and one of said power supply terminals, and commutation circuit means comprising a second linear inductor and series connected first commutating capacitor operatively connected at a first end thereof to the tap point of said first inductor and at a second end thereof to a power supply terminal, a third linear inductor and series connected second commutating capacitor operatively connected at a first end thereof to the tap point of said first inductor and at a second end thereof to the remaining power supply terminal, each of said series connected inductors and capacitors tuned to series resonance at a substantially higher frequency than the power circuit operating frequency, at least one of said pair of bidirectional conducting devices adapted to be intermittently conductive for discharging the commutating capacitors through the tapped first inductor and thereby commutating off the other of said pair of bidirectional conducting devices.

8. An improved power circuit including in combination a pair of gate turn-on, nongate turn-off, solid state triac bidirectional conducting devices, a tapped first linear inductor interconnected with said pair of triac devices in series circuit relationship across a pair of power supply terminals which are adapted to be connected across a source of electric potential, a load circuit including a series connected filter inductor, said load circuit operatively connected in series circuit relationship with a first of said pair of triac devices, said load circuit connected between the tap point of said first linear inductor and a terminal of a second of said pair of triac devices, commutation and pumpback gating circuit means and coasting gating circuit means operatively connected to the control gate of the second triac device for gating on said second device to cause it to conduct current in either direction as determined by the polarity of the potential applied thereat and at desired intervals relative to the conduction of the first triac device, load current and feedback gating circuit means operatively connected to the control gate of the first triac device for gating on said first device to cause it to conduct current in either direction as determined by the polarity of the potential applied thereat, and commutation circuit means comprising a second linear inductor and series connected first commutating capacitor operatively connected at a first end thereof to the tap point of said first inductor and at a second end thereof to one of said power supply terminals, a third linear inductor and series connected second commutating capacitor operatively at a first end thereof to the tap point of said first inductor and at a second end thereof to the remaining power supply terminal, each of said series connected inductors and capacitors tuned to series resonance at a substantially higher frequency than the power circuit operating frequency, said commutation circuit means being operable upon said second triac device being gated on and conducting whereby said commutating capacitors discharge through the tapped first inductor and thereby commutate off said first triac device.

9. The combination set forth in claim 8 further including a series circuit comprising a fourth inductor magnetically coupled to said tapped first linear inductor, and a diode, said latter series circuit connected across said power supply terminals and adapted to limit the voltage at the tap point of said tapped first inductor during the commutating interval and feed back excessive commutating energy to the source of electric potential.

10. The combination set forth in claim 8 further including a series circuit comprising a resistance and a third capacitor connected across one of said pair of triac devices for limiting the rate of rise of voltage across said triac device.

11. An improved power circuit including in combination a pair of turn-on, nongate turn-off solid state controlled conducting devices, a tapped first linear inductor interconnected with said pair of conducting devices in series circuit relationship across a pair of power supply terminals which are adapted to be connected across a source of electric potential, a load circuit including a series connected filter inductor, said load circuit operatively connected in series circuit relationship with a first of said pair of conducting devices, said load circuit connected between the tap point of said first linear inductor and a power supply terminal, firing circuit means operatively connected across the first conducting device for causing said first device to conduct at desired intervals, and commutation circuit means comprising a second linear inductor and series connected first commutating capacitor operatively connected at a first end thereof to the tap point of said first inductor and at a second end thereof to a first power supply terminal, a third linear inductor and series connected second commutating capacitor operatively at a first end thereof to the tap point of said first inductor and at a second end thereof to the remaining second power supply terminal, each of said series connected inductors and capacitors being tuned to series resonance at a substantially higher frequency than the power circuit operating frequency, said commutation circuit means being operable upon the second conducting device being caused to conduct whereby said commutating capacitors discharge through the tapped first inductor and thereby commutate off said first conducting device.

12. An improved power circuit using turn-on, nongate turn-off solid state conducting devices including in combination
- a pair of turn-on, nongate turn-off solid state controlled conducting devices,
- a tapped first linear inductance operatively interconnected with said pair of conducting devices in series circuit relationship across a pair of power supply terminals which are adapted to be connected across a source of electric potential,
- a pulse forming saturable reactor connected between said first inductance and at least one of said pair of conducting devices,
- a load circuit including a series connected filter inductance, said load circuit operatively connected in series circuit relationship with a first of said pair of conducting devices, said load circuit connected between the tap point of said first linear inductance and a terminal of a second of said pair of conducting devices, and
- commutation circuit means comprising a second linear inductance and series connected first commutating capacitor operatively connected at a first end thereof through said first inductance and at a second end thereof to a terminal of the first conducting device, a third linear inductance and series connected second commutating capacitor operatively at a first end thereof through said first inductance and at a second end thereof to a terminal of the second conducting device, each of said series connected inductances and capacitors tuned to series resonance at a substantially higher frequency than the power circuit operating frequency, said commutation circuit means being operable upon the second conducting device being caused to conduct whereby said commutating capacitors discharge through the load circuit and thereby commutate off said first conducting device.

13. An improved power circuit using turn-on, nongate turn-off solid state conducting devices including in combination
- a pair of turn-on, nongate turn-off solid state controlled conducting devices,
- a tapped first linear inductance interconnected with said pair of conducting devices in series circuit relationship across a pair of power supply terminals which are adapted to be connected across a source of electric potential,
- a load circuit including a series connected filter inductance, said load circuit operatively connected in series circuit relationship with a first of said pair of conducting devices, said load circuit connected between the tap point of said first linear inductance and a terminal of a second of said pair of conducting devices,
- first firing circiut means operatively connected across the first conducting device for causing said first device to conduct at desired intervals,
- second firing circuit means operatively connected across the second conducting device for causing said second device to conduct at desired intervals relative to the conduction of the first device,
- at least one isolating capacitor connected between the juncture of said first inductance and at least one of said pair of conducting devices and the power supply terminal connected to the respective conducting device, and
- commutation circuit means comprising a second linear inductance and series connected first commutating capacitor operatively connected at a first end thereof through said first inductance and at a second end thereof to a terminal of the first conducting device, a third linear inductance and series connected second commutating capacitor operatively at a first end thereof through said first inductance and at a second end thereof to a terminal of the second conducting device, each of said series connected inductances and commutating capacitors tuned to series resonance at a substantially higher frequency than the power circuit operating frequency, said commutation circuit means being operable upon the second conducting device being caused to conduct whereby said commutating capacitors discharge through the load circuit and thereby commutate off said first conducting device.

14. The combination set forth in claim 11 wherein said first conducting device is a diac, and the power circuit is further characterized by the addition of feedback current firing circuit means for causing the diac to conduct feedback current in a direction reverse to the flow of load current.

15. An improved power circuit including in combination
- a load current carrying turn-on, nongate turn-off solid state diac bidirectional conducting device, a tapped first linear inductance, and a coasting and feedback turn-on, nongate turn-off solid state diac all connected in series circuit relationship in the order named across a pair of power supply terminals that in turn are adapted to be connected across a direct current power supply,
- a load circuit including a series connected filter inductance, said load circuit connected between the tap point of said first inductance and the power supply terminal connected to said coasting and feedback diac,
- commutation circuit means comprising said tapped first inductance, a first commutating capacitor and a second linear inductance connected in series circuit relationship between the power supply terminal connected to said load current carrying diac and the tap point of said first inductance, and a second commutating capacitor and a third linear inductance connected in series circuit relationship between the power supply terminal connected to said coasting and feedback diac and the tap point of said first inductance, each of said series connected capacitors and inductances tuned to series resonance at a substantially higher frequency than the power circuit operating frequency,
- first firing circiut means operatively connected across said load current carrying diac for generating a firing pulse causing said latter diac to conduct load current at desired intervals, and
- second firing circuit means operatively connected across said coasting and feedback diac for generating a firing pulse for causing said coasting and feedback diac to conduct at desired intervals relative to the conduction of said load current carrying diac and thereby causing said commutating capacitors to discharge through the load circuit to commutate off said load current carrying diac.

16. The combination set forth in claim 15 further characterized by
- a first small saturable reactor connected between said tapped first inductance and said load current carrying diac, and a second small saturable reactor connected between said tapped first inductance and said coasting and feedback diac for shaping the firing pulses applied to the diacs, and
- means for isolating said first and second firing circuit means.

17. The combination set forth in claim 16 wherein the isolating means comprises a third capacitor connected between the power supply terminal connected to said load current carrying diac and the juncture of said first saturable reactor and said tapped first inductance, and a fourth capacitor connected between the power supply terminal connected to said coasting and feedback diac and the juncture of said second saturable reactor and said tapped first inductance.

18. The combination set forth in claim 16 wherein the isolating means comprises a third capacitor connected between the power supply terminal connected to said load current carrying diac and a point intermediate the tap point of said first inductance and a first end thereof, and a fourth capacitor connected between the power supply terminal connected to said coasting and feedback diac and a point intermediate the tap point of said first inductance and a second end thereof.

19. The combination set forth in claim 16 wherein the isolating means comprises the distributed capacitance across the second and third linear inductances, and the distributed capacitances between points adjacent opposite ends of said tapped first inductance and the tap point thereof.

20. The combination set forth in claim 15 further characterized by a feedback firing circuit operatively connected across said load current carrying diac for controlling the flow of feedback current therethrough.

21. The combination set forth in claim 20 further characterized by clamping means interconnecting said feedback firing circuit and said commutation circuit means for clamping off said feedback firing circuit during the commutation interval.

22. An improved power circuit including in combination
a load current carrying turn-on, nongate turn-off solid state $dv/dt$ fired silicon controlled rectifier having its gate open-circuited, a tapped first linear inductance, and a feedback turn-on, nongate turn-off solid state $dv/dt$ fired silicon controlled rectifier having its gate open-circuited all connected in series circuit relationship in the order named across a pair of power supply terminals that in turn are adapted to be connected across a direct current power supply,
a load circuit including a series connected filter inductance, said load circuit connected between the tap point of said first inductance and the power supply terminal connected to said feedback $dv/dt$ controlled rectifier,
a coasting diode connected in parallel circuit relationship with said feedback $dv/dt$ controlled rectifier in a reverse polarity sense,
commutation circuit means comprising said tapped first inductance, a first commutating capacitor and a second linear inductance connected in series circuit relationship between the power supply terminal connected to said load current carrying $dv/dt$ controlled rectifier and the tap point of said first inductance, and a second commutating capacitor and third linear inductance connected in series circuit relationship between the power supply terminal connected to said feedback $dv/dt$ controlled rectifier and the tap point of said first inductance, each of said series connected capacitors and inductances tuned to series resonance at a substantially higher frequency than the power circuit operating frequency,
first firing circuit means operatively connected across said load current carrying $dv/dt$ controlled rectifier for generating a firing pulse causing said latter $dv/dt$ controlled rectifier to conduct load current at desired intervals, and
second firing circuit means operatively connected across said feedback $dv/dt$ controlled rectifier for generating a firing pulse causing said feedback $dv/dt$ controlled rectifier to conduct at desired intervals relative to the conduction of said load current carrying $dv/dt$ controlled rectifier and thereby causing said commutating capacitors to discharge through the load circuit to commutate off said load current carrying $dv/dt$ controlled rectifier.

23. The combination set forth in claim 22 further characterized by a feedback diode connected in parallel circuit relationship with said load current carrying $dv/dt$ fired silicon controlled rectifier in a reverse polarity sense, and
means for isolating said first and second firing circuit means.

24. An improved power circuit including in combination
a load current carrying turn-on, nongate turn-off solid state controlled conducting device, a tapped first linear inductance, and a coasting and feedback turn-on, nongate turn-off conducting means all connected in series circuit relationship in the order named across a pair of power supply terminals that in turn are adapted to be connected across a direct current power supply,
a load circuit including a series connected filter inductance, said load circuit connected between the tap point of said first linear inductance and the power supply terminal connected to said coasting and feedback conducting means,
commutation circuit means comprising a first commutating capacitor and series connected second linear inductance connected between the power supply terminal connected to said load current carrying conducting device and the tap point of said first inductance, and a second commutating capacitor and series connected third linear inductance connected between the power supply terminal connected to said coasting and feedback conducting means and the tap point of said first inductance, each of the latter two series circuits tuned to series resonance at a substantially higher frequency than the power circuit operating frequency,
first firing circuit means operatively connected to said load current carrying conducting device for causing said conducting device to conduct load current at desired intervals, and
second firing circuit means operatively connected to said coasting and feedback conducting means for causing said latter conducting means to conduct at desired intervals relative to the conduction of said load current carrying conducting device and thereby causing said commutating capacitors to discharge through the load circuit to commutate off said load current carrying conducting device.

25. The combination set forth in claim 24 wherein said load current carrying conducting device is a $dv/dt$ silicon controlled rectifier having its gate open-circuited.

26. The combination set forth in claim 24 wherein said load current carrying conducting device is a gate turn-on, nongate turn-off solid state controlled conducting device.

27. The combination set forth in claim 26 wherein said gate turn-on, nongate turn-off device is a gate turn-on, nongate turn-off silicon controlled rectifier.

28. The combination set forth in claim 26 wherein said gate turn-on, nongate turn-off device is a triac.

29. The combination set forth in claim 24 wherein said load current carrying conducting device is a turn-on, nongate turn-off solid state bidirectional conducting device.

30. The combination set forth in claim 29 wherein said bidirectional conducting device is a diac.

31. The combination set forth in claim 24 wherein said coasting and feedback means is a $dv/dt$ fired silicon controlled rectifier having its gate open-circuited and a diode connected in parallel circuit relationship therewith in a reverse polarity sense.

32. The combination set forth in claim 24 wherein said coasting and feedback conducting means is a gate turn-on, nongate turn-off solid state controlled conducting device.

33. The combination set forth in claim 32 wherein said gate turn-on, nongate turn-off device is a gate turn-on, nongate turn-off silicon controlled rectifier and a diode connected in parallel circuit relationship therewith in a reverse polarity sense.

34. The combination set forth in claim 32 wherein said gate turn-on, nongate turn-off device is a triac.

35. The combination set forth in claim 24 wherein said coasting and feedback conducting means is a turn-on, nongate turn-off solid state bidirectional conducting device.

36. The combination set forth in claim 35 wherein said bidirectional conducting device is a diac.

37. An improved power circuit using turn-on, nongate turn-off controlled conducting devices including in combination a pair of turn-on, nongate turn-off controlled conducting devices interconnected with a tapped first linear inductance in series circuit relationship across a pair of power supply terminals which are adapted to be connected across a source of electric potential, and commutation circuit means comprised by a pair of series connected commutating capacitors connected across the power supply terminals, the juncture of said commutating capacitors connected to the tap point of said first inductance, the two portions of said first inductance having a low coupling with respect to each other whereby the resultant large leakage reactance represents an equivalent inductance in the connection between the juncture of the commutating capacitors and tap point of said first inductance, the series circuits comprised by each commutating capacitor and the equivalent inductance tuned to series resonance at a substantially higher frequency than the power circuit operating frequency, said pair of conducting devices each adapted to be intermittently conducting during selected time intervals whereby an electric current is caused to flow in a load circuit operatively connected to said first inductance.

38. An improved power circuit including in combination a pair of turn-on, nongate turn-off bidirectional conducting current switching devices at least one of said devices being a conductivity controlled bidirectional conducting device, a tapped first linear inductor interconnected with said pair of devices in series circuit relationship across a pair of power supply terminals which are adapted to be connected across a source of electric potential, a load circuit operatively coupled in series circuit relationship with at least one of said pair of devices through a part of said tapped first linear inductor across said power supply terminals for circulating load current therethrough, and commutation circuit means comprising at least one commutating capacitor and series connected second linear inductor operatively connected between at least one of said power supply terminals and through said tapped first inductor to said pair of devices for commutating off the devices, the series circuit comprised by the commutating capacitor and second inductor being tuned to series resonance at a commutating frequency having a period which is substantially shorter than the load current conducting periods of said power circuit, one of said pair of current switching devices being adapted to be intermittently conductive for discharging the commutating capacitor through the tapped first inductor and thereby terminating the conduction of the other of said pair of devices.

39. A power circuit according to claim 38 further including first firing circuit means coupled to the controlled conductivity, bidirectional conducting device for rendering said device conductive in a first direction dependent upon the polarity of the potential across the device, second firing circuit means coupled to said controlled conductivity, bidirectional conducting device for rendering the same conductive in a second direction opposite to the first, and lock-out circuit means coupled to said controlled conductivity, bidirectional conducting device for locking out and preventing application of gating-on signals thereto during the commutation intervals of operation.

40. A power circuit according to claim 39 wherein the one of said pair of bidirectional conducting current switching devices which is a controlled conductivity bidirectional conducting, current switching device comprises the commutating and coasting device of the circuit.

41. A power circuit according to claim 40 wherein the controlled conductivity, bidirectional conducting current switching device is a triac.

42. A power circuit according to claim 39 wherein both of said pair of bidirectional conducting current switching devices are controlled conductivity, bidirectional conducting current switching devices.

43. A power circuit according to claim 42 further including first firing circuit means coupled to each controlled conductivity, bidirectional conducting device for rendering said device conductive in a first direction dependent upon the polarity of the potential across the device, second firing circuit means coupled to each controlled conductivity, bidirectional conducting device for rendering the same conductive in a second direction opposite to the first, and lock-out circuit means coupled to each controlled conductivity, bidirectional conducting device for locking out and preventing application of gating-on signals thereto during the commutation intervals of operation.

44. A power circuit according to claim 42 wherein the current switching devices are triacs.

45. An improved full-wave bridge power circuit including in combination two series circuits connected in parallel circuit relationship across a pair of power supply terminals that in turn are adapted to be connected across a source of electric potential, each of said series circuits being comprised by a pair of conductivity controlled bidirectional conducting current switching devices and a tapped first linear inductor interconnecting the pair of devices in series circuit relationship, a load circuit interconnecting the tap points of said first inductors, first firing circuit means coupled to each controlled conductivity, bididectional conducting device for rendering said device conductive in a first direction depending upon the polarity of the potential across the device, second firing circuit means coupled to each controlled conductivity, bidirectional conducting device for rendering the same conductive in a second direction opposite to the first, lock-out circuit means coupled to each controlled conductivity, bidirectional conducting device for locking out and preventing application of gating-on signals thereto during the commuation intervals of operation, and commutation circuit means comprised by at least one series circuit formed by a commutating capacitor and series connected second linear inductor, said last mentioned series circuit being coupled between said power supply and one of said devices in each pair in its conducting condition through the tap point of the second linear inductor connected to such device for commutating off the same, the series circuit comprised by the commutating capacitor and second inductor being tuned to series resonance at a commutating frequency having a period which is substantially shorter than the load current conducting periods of the power circuit, one of said current switching devices in each pair of series connected devices being intermittently conductive for discharging the commutating capacitor through the tapped first inductor connected thereto and thereby terminating the conduction of the other of said pair of devices.

46. A bridge power circuit according to claim 45 wherein the controlled conductivity, bidirectional conductive devices are triacs.

47. A bridge power circuit according to claim 46 wherein the commutation circuit means is comprised by a single series circuit formed by a commutating capacitor and series connected second linear inductor connected in parallel circuit relationship with the load.

48. A bridge power circuit according to claim 46 wherein the commutation circuit means is comprised by two sets of series circuits each formed by a commutating capacitor and series connected second linear inductor with each set being connected between the tap point of a respective tapped first inductor and a tapped power source connected across the power supply terminals.

49. A bridge power circuit according to claim 46 wherein the commutation circuit means is comprised by four sets of series circuits each formed by a commutating capacitor and series connected second linear inductor with each set being connected in parallel circuit relationship with a respective conductivity controlled current switching device and its series connected winding portion of the tapped first linear inductor connected thereto.

References Cited

UNITED STATES PATENTS

| | | | |
|---|---|---|---|
| 3,128,396 | 4/1964 | Morgan | 307—88.5 |
| 3,263,152 | 7/1966 | Walker | 321—45 |
| 3,263,153 | 7/1966 | Lawn | 321—45 |
| 3,303,406 | 2/1967 | Bedford | 321—44 |

FOREIGN PATENTS 945   12/1963   Great Britain.

JOHN F. COUCH, *Primary Examiner.*

W. M. SHOOP, *Assistant Examiner.*